United States Patent
Di Cairano et al.

(10) Patent No.: US 11,731,655 B2
(45) Date of Patent: Aug. 22, 2023

(54) SYSTEM AND METHOD FOR CONTROLLING MOTION OF A VEHICLE TECHNICAL FIELD

(71) Applicant: Mitsubishi Electric Research Laboratories, Inc., Cambridge, MA (US)

(72) Inventors: Stefano Di Cairano, Cambridge, MA (US); Claus Danielson, Cambridge, MA (US); Di Chen, Ann Arbor, MI (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 118 days.

(21) Appl. No.: 17/451,005

(22) Filed: Oct. 15, 2021

(65) Prior Publication Data

US 2023/0123469 A1    Apr. 20, 2023

(51) Int. Cl.
*B60W 60/00*      (2020.01)
*B60W 30/18*      (2012.01)
*B62D 15/02*      (2006.01)
*B60W 40/11*      (2012.01)
*B60W 40/112*     (2012.01)

(52) U.S. Cl.
CPC .. *B60W 60/0013* (2020.02); *B60W 30/18109* (2013.01); *B60W 40/11* (2013.01); *B60W 40/112* (2013.01); *B62D 15/021* (2013.01)

(58) Field of Classification Search
CPC ....... B60W 60/0013; B60W 30/18109; B60W 40/11; B60W 40/112; B62D 15/021
See application file for complete search history.

(56) References Cited

U.S. PATENT DOCUMENTS 10,384,672 B1 *   8/2019   Katzourakis .......... B60W 10/22
2018/0186208 A1 * 7/2018   Coombs ............. B60G 17/0416

* cited by examiner

*Primary Examiner* — Tyler J Lee
*Assistant Examiner* — Yufeng Zhang
(74) *Attorney, Agent, or Firm* — Gennadiy Vinokur; Hironori Tsukamoto

(57) ABSTRACT

A controller and a method for controlling motion of a vehicle is provided. The method comprises acquiring motion information including a current state of the vehicle and a desired state of the vehicle, determining a combination of a steering angle of the wheels and motor forces for moving the vehicle from the current state into the desired state by using a first model of the motion of the vehicle and a second model of the motion of the chassis of the vehicle, determining a cost function of the motion of the vehicle, optimizing the cost function of the motion of the vehicle to compute a command signal for controlling the steering wheel and the plurality of electric motors, and controlling the steering angle of the wheels and the motor forces based on the command signal.

20 Claims, 15 Drawing Sheets

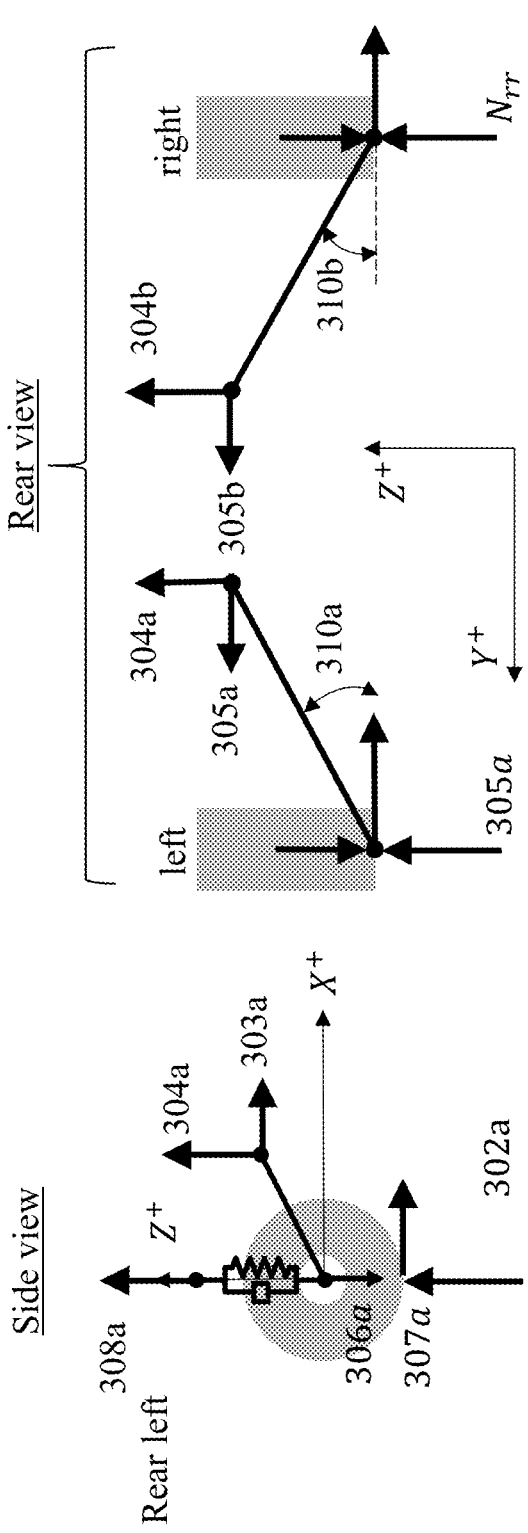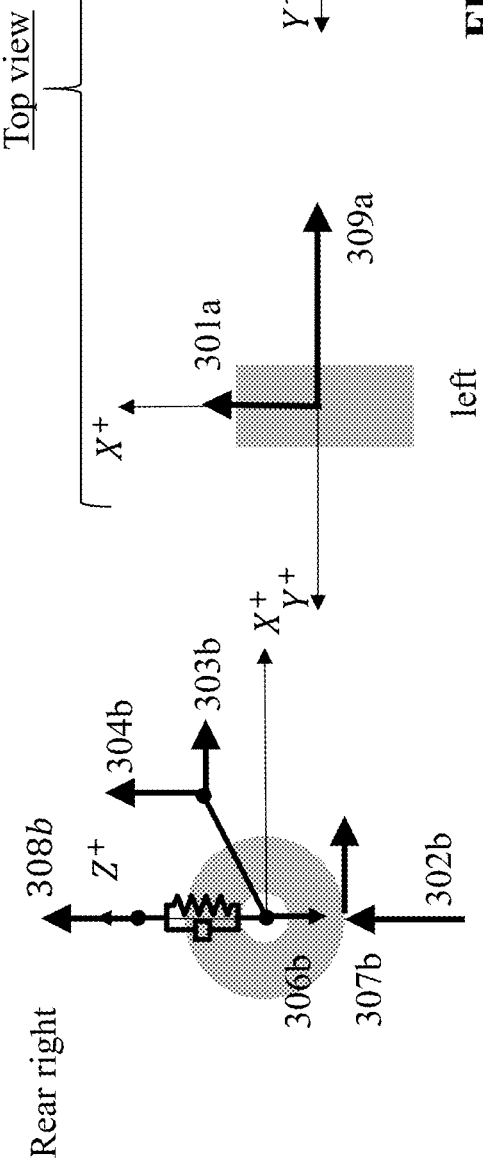
FIG. 3A
FIG. 3B
FIG. 3C

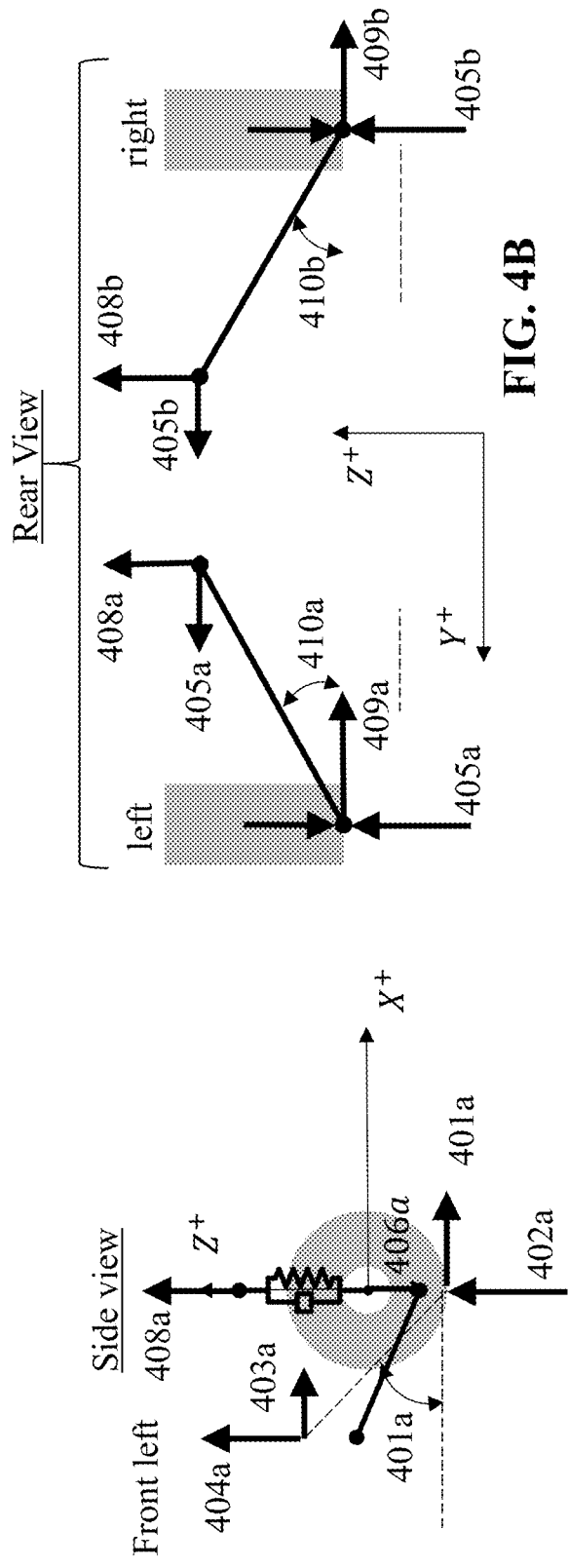
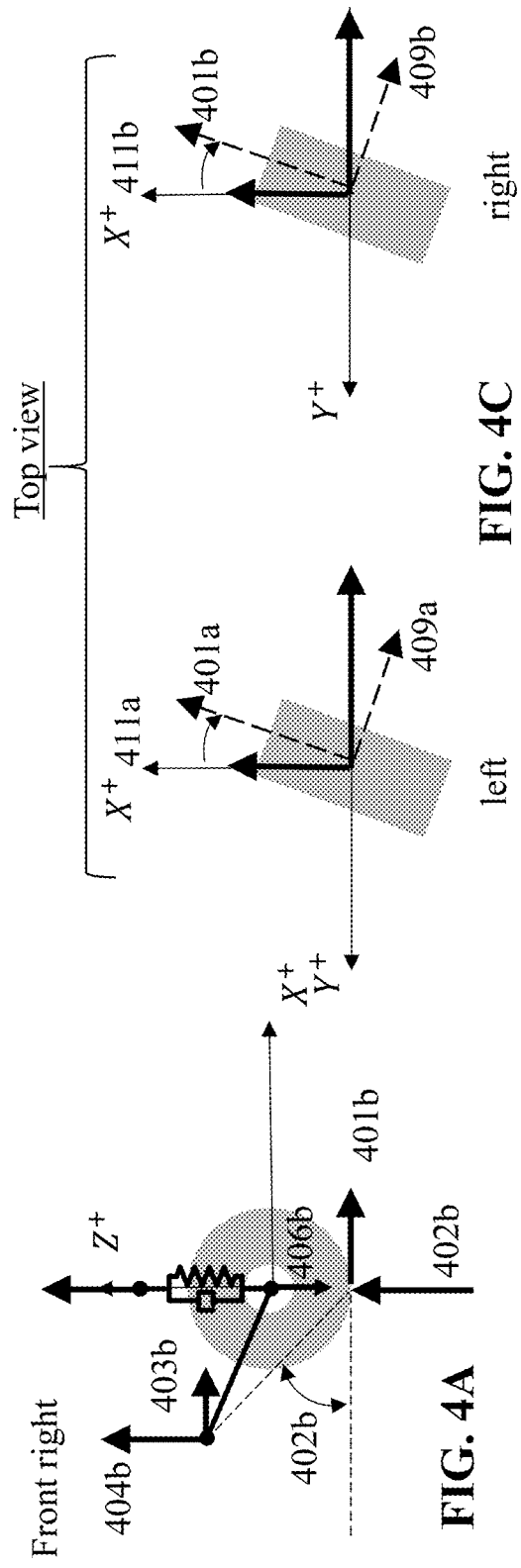
FIG. 4A
FIG. 4B
FIG. 4C

SYSTEM AND METHOD FOR CONTROLLING MOTION OF A VEHICLE

TECHNICAL FIELD

TECHNICAL FIELDS

The present disclosure relates generally to controlling vehicles, and more particularly to a controller and a method for controlling motion of a vehicle.

BACKGROUND

Vehicles powered by internal combustion engines (ICEs) usually have a single powerplant, i.e., a single engine. Because the ICEs require complex piping of intake and exhaust gasses and fuel lines, as well as a heavy engine block for which a weight of the engine block does not scale linearly with the engine displacement. Therefore, vehicles powered by the ICEs use the engine and brakes for achieving a desired acceleration, and consequently a desired velocity, and steering to achieve a desired direction. As the vehicle accelerates and steers, a chassis of the vehicle moves with respect to the wheels, and the motion is determined by suspensions. The motion of the chassis, in particular roll, pitch, and lift, influences the comfort of passengers in the vehicle, for instance affecting motion sickness and stress on passenger bodies. Conventionally, the vehicles use passive suspensions, includes spring and dampers, which always react in the same manner to external forces, because they are not actively controlled. High performance vehicles may be equipped with active suspensions, which are actively controlled. However, the active suspensions are expensive and have limited durability due to large excitations on actuators of the vehicle for providing active control to the active suspensions. In some cases, high-performance vehicles may use semi-active suspensions, such as magnetorheological suspensions, which have some degree of control on the suspensions but not as much as the active suspensions.

In Electric Vehicles (EVs) the ICE is replaced with electric motors. Since an electric motor does not require piping and fuel lines, but only electric wires, it is feasible to include multiple electric motors within a single vehicle. When multiple motors are present within the single vehicle, additional degrees of freedom are achieved since a desired (or requested) acceleration can be achieved by any combination of forces at each different electric motor resulting into the same required total force. The additional degrees of freedom can be used to support actuators of the vehicle that achieve different goals, such as supporting the steering in changing the direction of the vehicle, and the likes. In fact, due to suspension geometry, the forces produced by the electric motor can be used to influence the motion of the chassis. In this way, the EVs can also achieve the same objective as that of the active suspensions, without the need of the expensive and less durable components of the active suspensions.

However, the coordination of multiple electric motors and steering to achieve concurrent drivability of the vehicle and comfort of the passenger, by providing the desired vehicle acceleration and direction changes while improving passenger comfort, is challenging.

Therefore, there is a need of controlling the motion of a vehicle to achieve a desired state of the motion of the vehicle while maintaining the comfort of the passenger.

SUMMARY

Some embodiments are based on the realization that rapid achievement of the desired vehicle acceleration and direction requirement, and the reduction of relative motion of the chassis, i.e., a comfort objective of the vehicle, are interconnected and conflicting. The interconnection is due to the dynamic coupling of the chassis and the vehicle wheels, while the conflict is due to that with rapid changes in acceleration and direction of the vehicle, the chassis moves more and more quickly. Further, there may be constraints affecting certain quantities of the vehicle motion, for instance, due to physical limitation of the vehicle or limitation imposed by a road to avoid loss of stability of the vehicle, and constraints associated with the motor and steering system of the vehicle. Thus, achieving concurrent drivability of the vehicle and the comfort of the passenger, by providing the desired vehicle acceleration and direction changes, is challenging.

Accordingly, it is an objective of some embodiments of the present disclosure to improve the drivability of the vehicle by quickly changing the vehicle states while improving the comfort of the passengers by reducing different motion parameters of the vehicle such as lift, roll, pitch. For instance, the vehicle state is modified such that a desired yaw rate and acceleration are achieved, so that the vehicle longitudinal motion and turning motion is as desired by a driver or an autonomous driving system. However, when such state modification occurs, the vehicle motion causes changes in the pitch, roll, and lift, which should be eliminated.

To that end, the present disclosure proposes a controller for controlling the motion of the vehicle to simultaneously achieve the drivability as well as the comfort. In particular, the controller comprises a prediction model to predict the effect of one or more command signals to control the vehicle, and uses that to select the commands to be applied to control the vehicle.

Some embodiments are based on the realization that achieving the desired drivability of the vehicle while maintaining the comfort of the passenger by reducing the pitch, roll, lift motion of the chassis of the vehicle is challenging. In particular, deriving a single non-structured model to predict the behavior of the vehicle and the chassis, and to determine the optimal input to be applied is limited by complexity of its structure. Accordingly, it is also an objective of some embodiments to achieve different objectives for different parts of the model such as tracking of the desired state of the vehicle, the elimination of the movements of the chassis, and the like.

Some embodiments are based on the realization that since the drivability objective is to change the state to track time varying signals, and the comfort objective is to avoid changes to the states, the prediction model comprises two models: a first model and a second model.

The first model describes the motion of the vehicle, and the second model describes motion of the chassis of the vehicle, such that the different specifications can be implemented on the different models. Further, the first model has direct effects on the second model, yet the second model effects on the first model are null or negligible.

Some embodiments are based on the realization that the chassis motion results directly from the vehicle motion, the road traveled and the suspension system, with no direct control over it.

Some embodiments are based on the realization that higher comfort for the passenger is achieved by reducing lift, pitch, and roll motion of the chassis of the vehicle. To improve the comfort of the passengers, in some embodiments of the present disclosure, traction forces are allocated to each of the wheels and the steering angle is set to achieve the driver specified acceleration and yaw-rate while reducing the motion of the chassis in the lift, pitch, and roll directions.

Some embodiments are based on the realization that the drivability of the vehicle is based on rapidity of achieving driver specified acceleration and yaw-rate, and the consistency of such behavior with respect to the changing external conditions, such as road roughness, weather, vehicle loading.

Some embodiments are based on the realization that it is possible to reduce lift, pitch, and roll motion of the chassis without sacrificing, or actually even improving, drivability for the vehicle.

To that end, some embodiments use multiple electric motors to independently actuate the vehicle wheels that provide three additional degrees of freedom while maintaining drivability i.e., for the vehicle with independently driven wheels there are four "throttles" instead of one.

Some embodiments are based on the realization that it is possible to reduce the loss of control of the vehicle, that is, to reduce the conditions on which the vehicle yaw rate changes uncontrollably, and the vehicle spins in the road due to loss of tire adhesion to the road, especially for the rear tires.

Accordingly, one embodiment of the present disclosure provides a controller for controlling motion of a vehicle including a chassis connected by suspensions to wheels touching a surface supporting the motion of the vehicle, where the vehicle is equipped with a steering system for steering at least some of the wheels and a plurality of electric motors for rotating the wheels. The controller comprises: a processor; and a memory having instructions stored thereon that, when executed by the processor, cause the controller to: acquire motion information including a current state of the vehicle and a desired state of the vehicle, wherein a state of the vehicle defines at least one of: a velocity of the vehicle, an acceleration of the vehicle, an orientation of the vehicle, and an orientation rate of the vehicle. The controller is further configured to determine a combination of a steering angle of the wheels and motor forces delivered on the surface supporting the motion of the vehicle by the electric motors. The combination of the steering angle of the wheels and the motor forces is used for moving the vehicle from the current state into the desired state by using a first model of the motion of the vehicle and a second model of the motion of the chassis of the vehicle, wherein a state of the first model affects changes to a state of the second model, and the changes to the state of the first model are independent of the changes to the state of the second model. The controller is further configured to determine a cost function of the motion of the vehicle over a future prediction horizon; optimize the cost function of the motion of the vehicle to compute a command signal for controlling the steering wheel and the plurality of electric motors by penalizing an increase of one or a combination of a roll, a pitch, and a lift of the vehicle caused by a change of state of the vehicle; and control the steering system and the electric motors based on the control signal.

Another embodiment of the present disclosure provides a method for controlling motion of a vehicle including a chassis connected by suspensions to wheels touching a surface supporting the motion of the vehicle, wherein the vehicle is equipped with a steering system for steering at least some of the wheels and a plurality of electric motors for rotating the wheels. The method comprises: acquiring motion information including a current state of the vehicle and a desired state of the vehicle, wherein a state of the vehicle defines at least one of: a velocity of the vehicle, an acceleration of the vehicle, an orientation of the vehicle, and an orientation rate of the vehicle; determining a combination of a steering angle of the wheels and motor forces delivered on the surface supporting the motion of the vehicle by the electric motors. The combination of the steering angle of the wheels and the motor forces is used for moving the vehicle from the current state into the desired state by using a first model of the motion of the vehicle and a second model of the motion of the chassis of the vehicle, wherein a state of the first model affects changes to a state of the second model, and the changes to the state of the first model are independent of the changes to the state of the second model. The method further comprises determining a cost function of the motion of the vehicle over a future prediction horizon; optimizing the cost function of the motion of the vehicle to compute a command signal for controlling the steering wheel and the plurality of electric motors by penalizing an increase of one or a combination of a roll, a pitch, and a lift of the vehicle caused by a change of state of the vehicle; and controlling the steering system and the electric motors based on the command signal.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3A shows a side view of a trailing arm front suspension of the vehicle, according to an example embodiment.

FIG. 3B shows a rear view the trailing arm front suspension of the vehicle, according to an example embodiment.

FIG. 3C shows a top view of the trailing arm front suspension of the vehicle, according to an example embodiment.

FIG. 4A shows a side view of a rear suspension of the vehicle, according to an example embodiment.

FIG. 4B shows a rear view of the rear suspension of the vehicle, according to an example embodiment.

FIG. 4C shows a top view of the rear suspension of the vehicle, according to an example embodiment.

DETAILED DESCRIPTION

Figure 1:
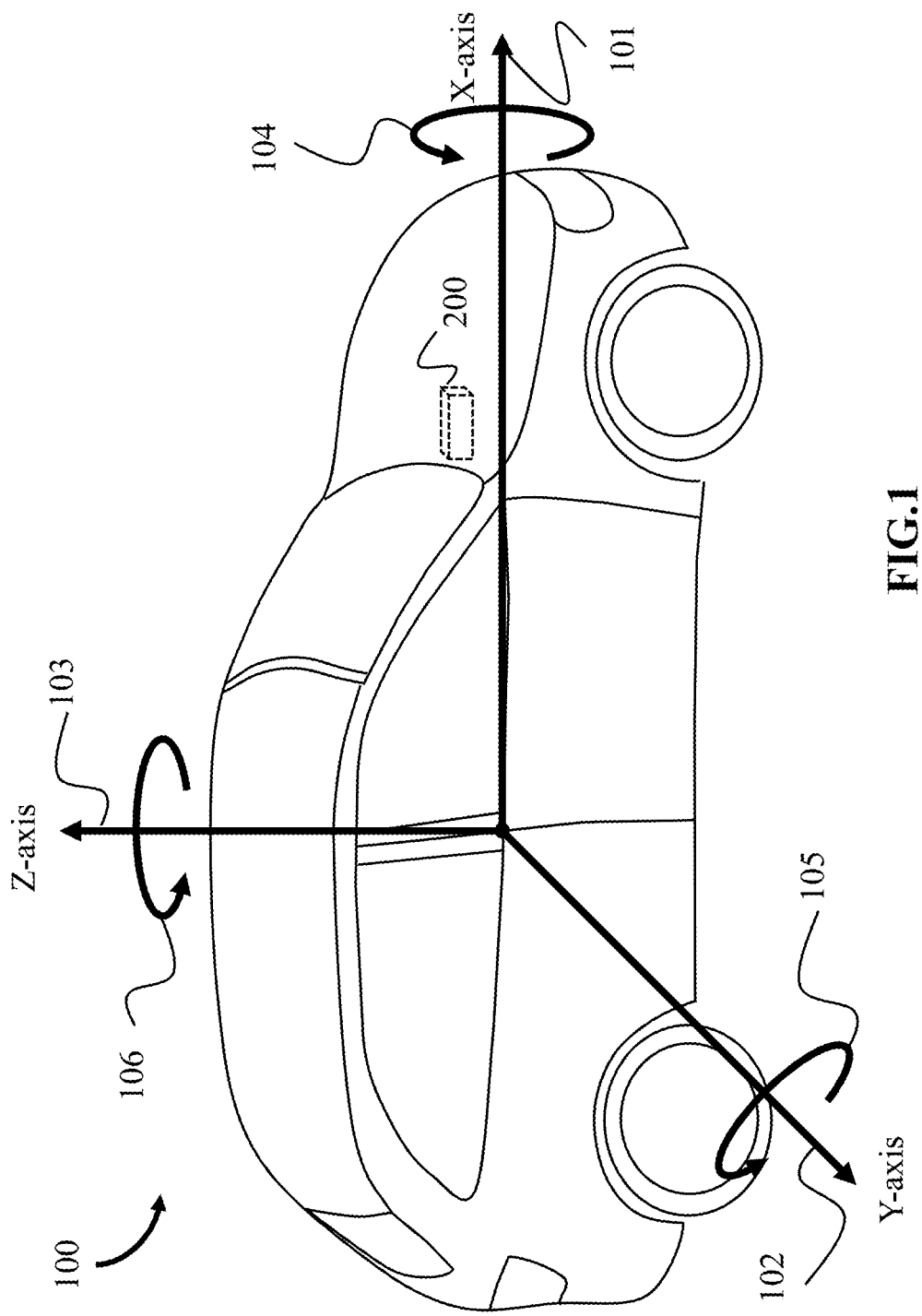
FIG. 1 shows a schematic of a vehicle with different motion axes, according to an example embodiment.

A vehicle is a device designed to move from one location to another location, while transporting people (also referred to as "passengers") and/or goods (also referred to as "cargo"). For the comfort of the passengers and the integrity of the cargo, the vehicle is equipped with a chassis connected to the wheels, that are in contact to the ground, by a suspension system. As the vehicle moves around, the chassis also moves with oscillations related to the design of the suspension system. Such oscillations avoid excessive forces being transferred instantaneously to the chassis, which could harm the passengers and the cargo. However, the oscillations reduce the comfort of the passengers leading to effects such as road sickness or disorientation. Once the motion of the vehicle is fixed, the motion of the chassis is controlled by an active or semi-active suspension. However, the active suspensions are expensive and have limited lifespan as compared to the life of the vehicle, while the semi-active suspension are incapable of controlling the range of frequency of the oscillation that reduces the comfort of the passengers. Thus, most vehicles use passive suspension that do not provide any control means on the motion of the chassis.

Electric vehicles (EV) are powered by electric motors. To power the electric motors, electrical current is obtained from storage batteries. The electrical motors are more efficiently scaled in size and do not need gas intakes and exhaust, fuel lines, pumps, or the likes, but only electrical cabling. Therefore, it is possible to place more than one electric motors in an EV. Accordingly, a total power of a single larger motor is achieved by a plurality of electric motors in the EV. However, each electric motor of the plurality of electric motors is independently controlled, that provides additional degrees of freedom. Therefore, once a required motor power is determined (for instance, based on a driver command) there are multiple ways to obtain that power from the plurality of motors.

For instance, with four motors, the required motor power is generated by at least one of: splitting the power request equally among all the four motors, assigning the power request to only to one specific motor, splitting the power request between two motors and not requesting any power to the other two.

Some embodiments are based on the realization that the additional degrees of freedom provided by the plurality of motors can be used to control the motion of the chassis without reducing the responsiveness of the entire vehicle to the driver steering and acceleration commands (i.e., without reducing the motion performance of the vehicle).

To that end, the splitting of the power among the plurality of electric motors, and the steering angle of the steering system are appropriately determined, for trading off the vehicle motion objectives and the chassis motion objectives. The vehicle motion objectives are maximized in the speed with which the plurality of electric motors achieve the driver requests, and the chassis motion objectives are minimized in reducing the motion caused to the chassis.

FIG. 1 shows a schematic of a vehicle 100 with different motion axes, according to an example embodiment. The vehicle 100 includes four wheels that are attached to the chassis (not shown) through a suspension system (not shown). In FIG. 1, there is shown three axes X-axis 101, Y-axis 102, and Z-axis 103 indicative of motion of the vehicle 100 in different dimensions.

The X-axis 101 of a coordinate frame attached to the vehicle 100 corresponds to a longitudinal direction, where longitudinal motion includes position, velocity, acceleration, jerk, and the likes of the chassis. Rotation 104 of the chassis about the X-axis 101 is called as a roll, where roll motion includes the angle, angular velocity, and angular acceleration of the chassis.

The Y-axis 102 of the coordinate frame attached to the vehicle 100 is called as a lateral direction, where lateral motion includes the position, velocity, acceleration, jerk, and the likes of the chassis. Rotation 105 of the chassis about the X-axis 102 is called as a pitch, where pitch motion includes the angle, angular velocity, angular acceleration of the chassis.

The Z-axis 103 of the coordinate frame attached to the vehicle 100 is called as a lift direction, where lift motion includes the position, velocity, acceleration, jerk, and the likes of the chassis. Rotation 106 of the chassis about the Z-axis 103 is called as a yaw, where yaw motion includes the angle, angular velocity, and angular acceleration of the chassis.

To improve comfort of the passengers by reducing the motion of the chassis of the vehicle 100, some embodiments are based on the realization that chassis motion is not eliminated completely as the purpose of the vehicle 100 to move the chassis (and its contents) between locations cannot be achieved by eliminating the motion of the chassis. In particular, some embodiments are based on two main factors that causes motion in the chassis of the vehicle 100 which are movements of the vehicle 100 and the quality of the road surface over which the vehicle 100 traverses.

In some embodiments, the chassis motion is reduced while improving the drivability of the vehicle 100. The drivability defines how rapidly, predictably, and repeatably the vehicle 100 responds to the commands by a driver or by an autonomous driving system.

Some embodiments are based on the realization that the motion of the chassis of the vehicle 100 can be eliminated by stopping the vehicle 100, or at least by significantly slowing down motion of the vehicle 100. However, such methods reduce the drivability of the vehicle 100, as the vehicle 100 stops or moves more slowly than as requested by the commands for the vehicle 100 to reach a specific destination of the vehicle 100. Similarly, a roll motion of the vehicle 100 is avoided by preventing the vehicle 100 from turning. However, preventing the vehicle from achieving the turning that is requested by the commands may cause severe consequences (such as accidents) for the vehicle 100 traversing on the road.

In an example embodiment, the vehicle 100 is an autonomous driving vehicle, where the autonomous driving vehicle comprises a motion planner. In such a case, a state of the motion of the vehicle 100 is changed (for example, from a current state 20 km/h to a desired state 40 km/h) based on information by the motion planner.

In another example embodiment, the vehicle 100 is driven by a human driver. In such a case, a state of the motion of the vehicle 100 is changed (for example, from a current state 20 km/h to a desired state 40 km/h) based on information of the actions of the driver, such as rotation of the steering wheel and depression of accelerator and brake pedals.

To control the vehicle 100, the present disclosure provides a vehicle control system (VCS) 200. The VCS 200 is configured to control the motion of the vehicle 100 and the motion of the chassis of the vehicle 100. To that end, the VCS 200 is configured to control the motion of the vehicle 100 in the longitudinal and yaw directions. Further, the gas/brake pedals are used to control the longitudinal acceleration i.e., velocity and position of the vehicle 100. Further, the VCS 200 is configured to control the steering wheel to control the vehicle 100. The VCS 200 is described in detail below with reference to FIG. 2.

Figure 2:
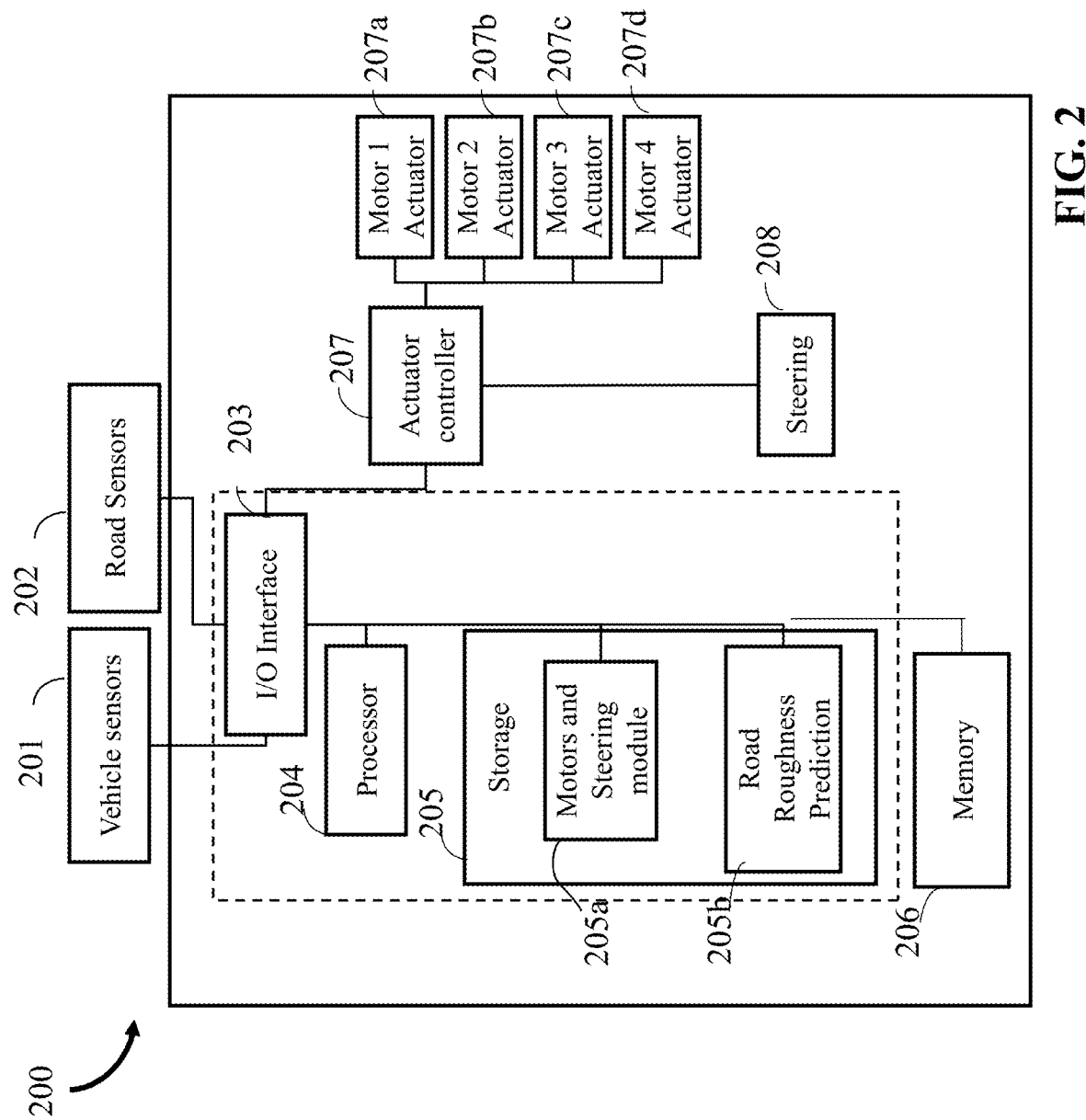
FIG. 2 shows a block diagram of a vehicle control system (VCS), according to an example embodiment.

FIG. 2 shows a block diagram of the vehicle control system (VCS) 200, according to an example embodiment. The VCS 200 includes an input/output interface (I/O) 203 connected to vehicle sensors 201, road sensors 202, one or more processors 204 configured to execute stored instructions, and a memory 206 that stores instructions that are executable by the one or more processors 204. The one or more processors 204 can be a single core processor, a multi-core processor, a computing cluster, or any number of other configurations. The memory 206 can include random access memory (RAM), read only memory (ROM), flash memory, or any other suitable memory systems. The I/O interface 203 may be connected to other components (such as the memory 206, and the likes) of the VCS 200 through a bus 209.

The VCS 200 further includes a storage device 205 configured to store various modules such as a Motors and Steering Control (MSC) module 205a and a Road Roughness Prediction module 205b.

The I/O interface 203 is configured to establish at least one of a wired network or a wireless network inside the vehicle 100 and perform data communications between input/output devices of the VCS 200 such as the vehicle sensor(s) 201, the road sensors 202, a steering 208, and an actuator controller 207 configured to control motor actuator 1 (207a), motor actuator 2 (207b), motor actuator 3 (207c), and motor actuator 4 (207d) of the wheels of the vehicle 100, where each motor actuator (207a-207d) is configured to actuate their corresponding motors of the vehicle 100. Accordingly, each motor of the four motors of the vehicle 100 is controlled by a corresponding motor actuator.

Initially, the one or more processors 204 obtains sensor data from the vehicle sensor(s) 201 and the road sensors 202, via the I/O interface 203. The one or more processors 204 is configured to execute the road roughness prediction module 205b, and the motors and steering control (MSC) module 205a.

Further, the one or more processors 204 is configured to transmit control data to the actuator controller 207 via the interface 203, while executing the road roughness prediction module 205b and the MSC module 205a in response to signals (data) from the vehicle sensor(s) 201 and the road sensor 202. The actuator controller 207 is configured to receive the control data (also referred to as "signals") from the one or more processors 204 via the I/O interface 203, and to perform the steering control and a throttle/brake control of each of the four motors and motor actuators (207a-207d) based on the signals received from the one or more processors 204. In an example embodiment, the actuator controller 207 is configured to use a steering actuator (not shown in FIG. 2) to control the steering 208. Thus, the actuator controller 207 achieves the throttle allocations of the motor actuators 207a-207d and the steering 208 of the vehicle 100 based on the control data from the one or more processors 204.

In some embodiments, the VCS 200 allocates traction forces to each of the wheels and sets a steering angle of the steering 208 of the vehicle 100 to reduce the chassis motion due to vehicle motion and road roughness while improving drivability. In another embodiment, the road roughness is measured by the road sensors 202 and such measurements are used to compute the traction forces and steering angle of the steering 208 of the vehicle 100. In yet another embodiment, the road roughness is unmeasured, but the resulting motion of the chassis is measured using the vehicle sensors 201 (also referred to as "vehicle motion sensors") arranged on/in the vehicle 100 or external sensors (not shown in FIG. 2) communicating with the vehicle control system 200. Further, the vehicle motion sensors 201 are used to compute the traction forces and steering angle of the vehicle 100 to reduce the chassis motion and maintain the drivability. In another embodiment, measurements of the road roughness and chassis motion obtained using the vehicle motion sensors 201 and the road sensors 202 are used to compute the traction forces and steering angle of the steering of the vehicle 100 that reduce chassis motion and maintain drivability.

Some embodiments are based on the realization that conventionally vehicles have two actuators that are used to drive the vehicle: (1) throttle/brake and (2) steering angle of the tires (for example, front tires). These actuators are used to follow a desired acceleration and yaw-rate specified by the driver, where the driver is either a human or an autonomous driving system. For a human driver, the desired acceleration and yaw-rate are specified by the position of the gas/brake petal and the steering wheel angle. On the other hand, for an autonomous driving system, the desired acceleration and yaw-rate are specified by different methods. These two actuators of the traditional vehicles are used to achieve two driving objectives that are to track the desired acceleration and to track yaw-rate.

Some embodiments are based on further realization that wheeled vehicles (e.g., cars) that have a plurality of independently actuated wheels (for example, four wheels) controlled by corresponding plurality of motors have additional actuators by actuating each wheel of the plurality of wheel, where each of the actuated wheels is configured to control both the traction and braking forces produced by each wheel independently from each other.

In an example embodiment, independent actuation of each wheel of the plurality of wheels is achieved by using "hub motors" located in each wheel. In another embodiment, the independent actuation of each wheel of the plurality of wheels is controlled even when the plurality of motors corresponding to each wheel are external to the wheel, that is, placed on the vehicle body and connected to the wheels by appropriate drivelines.

In some embodiment, at least one of the wheels of the vehicle 100 is not independently actuated. Such wheels are forced by the actuator controller 207 to behave like the other wheels of the plurality the wheels that are actuated by their corresponding motors. For instance, the at least one wheel that is not independently actuated is forced by the actuator controller 207 to produce the same forces as other wheels. Further, the MSC 205a imposes constraints on the nonactuated wheels reflective of such behavior. For instance, the at least one wheel that is not independently actuated is expected to never produce any traction force by the VCS 200.

In an example embodiment, the VCS 200 is used to achieve desired drivability and comfort by reducing the motion of the chassis of autonomous driving vehicles, where the autonomous driving vehicles are steered electronically via a wired connection to the VCS 200 and have no mechanical contact between the steering wheel and the steering angle.

In an example embodiment, the VCS 200 is configured to control the motion of a semi-autonomous vehicle, where the steering 208 is jointly controlled by the driver and the VCS 200. For example, in an active front steering system that enables a steering angle to be produced at front wheels of the vehicle 100 which deviates from a steering wheel angle turned by the driver, a value of the steering angle is controlled by the VCS 200 by adding, to the steering wheel angle turned by the driver, an additional steering angle to be realized by an active steering actuator, such as a synchronous motor, to obtain the amount of steering angle determined by the VCS 200.

In an example embodiment, the VCS 200 is used to control the motion of the vehicle 100, where the steering 208 is entirely controlled by the driver, in which case the actuator controller 207 fixes the steering 208 to a steering angle value determined by the driver and the MSC 205 a imposes constraints on the steering 208 based on the determined steering angle value.

Some embodiments are based on the realization that vehicles with independently throttled/braked wheels have three additional degrees of freedom i.e., four throttle/brake and one steering angle. Such additional degrees of freedom can be used to improve passenger comfort by reducing the lift, pitch, and roll motion of the vehicle chassis.

Some embodiments are based on the realization that the longitudinal and lateral forces produced by the wheels create vertical forces on the chassis due to the way in which vehicle suspensions are designed. The longitudinal and lateral forces produced by the wheels are predicted based on approximated dynamical models of the vehicle 100 and chassis motions that also include the suspension geometry.

FIG. 3A shows a side view of a trailing arm front suspension of the vehicle 100, according to an example embodiment. FIG. 3B shows a rear view of the trailing arm front suspension of the vehicle 100, according to an example embodiment. FIG. 3C shows a top view of the trailing arm front suspension of the vehicle 100, according to an example embodiment. For the ease of describing only a trailing arm suspension is shown in FIG. 3A, FIG. 3B, and FIG. 3C. Other suspension designs are dynamically equivalent to the trailing arm suspension. The key feature of the trailing arm suspension is that the suspension arm rotates around a pivot. Thus, the wheel connected using the trailing arm suspension cannot move horizontally (i.e., in the longitudinal or in the lateral direction) without moving vertically due to the rotation of the suspension arm.

FIG. 3A and FIG. 3B show the forces on the front suspension. The forces on the trailing arm front suspension are shown in a free-body diagram of the front suspension. The front suspension exerts four types of forces on the vehicle chassis (a for left forces and b for right forces):

Longitudinal reaction forces 303a and 303b (FIG. 3A): The left and right tires produce driving forces 301a and 301b (FIG. 3C) for the vehicle 100 to accelerate/decelerate. The suspension transmits the driving forces 301a and 301b to the vehicle chassis, producing the longitudinal forces 303a and 303b.

Lateral reaction forces 305a and 305b (FIG. 3B): The left and right tires produce sliding forces 309a and 309b (FIG. 3C), respectively, when the vehicle 100 turns. The suspension transmits the tire-sliding forces 309a and 309b to the chassis, producing the lateral forces 305a and 305b, respectively.

Spring-damper forces 308a and 308b (FIG. 3A): The deformation of the springs and the movement of the dampers in the suspension produces forces 308a and 308b on the chassis. The deformation/movement of the springs/dampers is caused either by the vehicle chassis moving relative to the road or by the road height "moving" relative to the vehicle 100, i.e., the vehicle 100 is driving over a bump. The spring-damper forces damp the relative chassis-road motion and restore it to the default position, i.e., chassis is flat relative to the road.

Vertical reaction forces 304a and 304b (FIG. 3A and FIG. 3B): Since the suspension arms are angled, 302a, 302b (FIG. 3A) and 310a, 310b (FIG. 3B), the longitudinal forces 303a, 303b and lateral forces 305a, 305b produce a torque on the suspension arm. In quasi-steady state, this torque is balanced by the vertical reaction forces 304a, 304b. Applying a throttle force 302a, 302b to one of the front wheels results in a negative vertical reaction force 304a, 304b on the suspension. Since FIG. 3 shows the front suspension, these vertical reaction forces 304a, 304b are the anti-lift forces that prevent the front end of the vehicle front lifting during acceleration. Some embodiments are based on the realization that since these vertical reaction forces 304a, 304b depend on the actuated driving forces 303a, 303b, they can be manipulated to control the lift, pitch, and roll motion of the chassis.

FIG. 4A shows a side view of a rear suspension of the vehicle 100, according to an example embodiment. FIG. 4B shows a rear view of the rear suspension of the vehicle 100, according to an example embodiment. FIG. 4C shows a top view of the rear suspension of the vehicle 100, according to an example embodiment. FIG. 4A and FIG. 4B show the free-body diagram of one of the rear suspension assemblies.

Similar to the front suspension assembly (in FIG. 3A-FIG. 3C), a positive vertical reaction force on the vehicle suspension produced by a throttle force on the rear wheel is derived. The positive vertical reaction force is called the anti-squat force since it prevents the rear-end of the vehicle from "power squatting" during acceleration.

The rear suspension exerts four types of forces on the vehicle chassis (a for left forces and b for right forces):

Longitudinal reaction forces 103a and 403b (FIG. 4A): The left and right tires produce driving forces 401a and 401b (FIG. 4a and FIG. 4C) for the vehicle 100 to accelerate/decelerate. The rear suspension transmits the driving forces 401a and 401b to the vehicle chassis, producing the longitudinal forces 403a and 403b.

Lateral reaction forces 405a and 405b (FIG. 4B): The left and right tires produce sliding forces 409a and 409b (FIG. 4B and FIG. 4C), respectively, when the vehicle 100 turns. The suspension transmits the tire-sliding forces 409a and 409b to the chassis, producing the lateral forces 405a and 405b, respectively.

Spring-damper forces 408a and 408b (FIG. 4A): The deformation of the springs and the movement of the dampers in the suspension produces forces 408a and 408b on the chassis. The deformation/movement of the springs/dampers is caused either by the vehicle chassis moving relative to the road or by the road height "moving" relative to the vehicle 100, i.e., the vehicle 100 is driving over a bump. The spring-damper forces damp the relative chassis-road motion and restore it to the default position, i.e., chassis is flat relative to the road.

Vertical reaction forces 404a and 404b (FIG. 4A): Since the suspension arms are angled, 402a, 402b (FIG. 3A) and 410a, 410b (FIG. 4B), the longitudinal forces 403a, 403b and lateral forces 405a, 405b produce a torque on the suspension arm. In quasi-steady state, this torque is balanced by the vertical reaction forces 404a, 404b. Applying a throttle force 402a, 402b to one of the rear wheels results in a positive vertical reaction force 404a, 404b on the rear suspension. Since FIG. 4 shows the rear suspension, these vertical reaction forces 404a, 404b are the anti-lift forces and the anti-squat forces that prevent the rear end of the vehicle 100 from lifting during acceleration. Some embodiments are based on the realization that since these vertical reaction forces 404a, 404b depend on the actuated driving forces 403a, 403b, they can be manipulated to control the lift, pitch, and roll motion of the chassis.

In some embodiments, the VCS 200 uses the anti-lift and anti-squat forces to manipulate the motion of the vehicle chassis.

Figure 5:
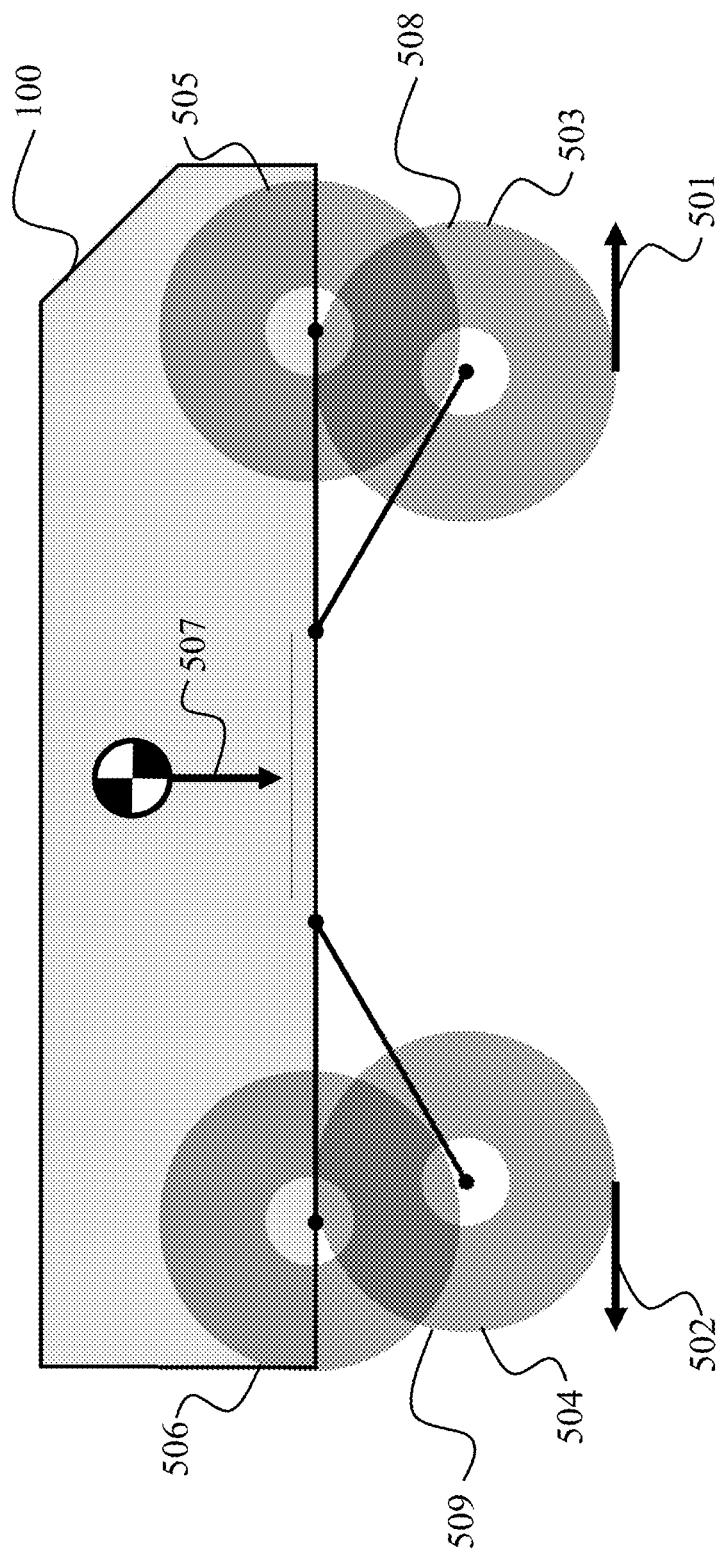
FIG. 5 shows effect of the throttle/brake forces, applied to the front and rear wheels, on the vehicle lift, according to an example embodiment.

FIG. 5 shows effect of the throttle/brake forces (501, 502), applied to the front and rear wheels, on the vehicle lift, according to an example embodiment. The arrows 501 and 502 represent driving forces produced by the front tire and rear tire, respectively. For the ease of description, the motion of the vehicle 100 in the pitch-plane (or pitch direction) is shown in FIG. 5. FIG. 5 shows a side view of the vehicle 100. Thus, the forces on the front left tire 508 and the front right tire (not shown in FIG. 5) are the same. Similarly, the forces on the rear left tire (not shown in FIG. 5) and the rear right tire 509 are the same. For three-dimensional (3D) control of the chassis motion, different forces are applied to the left tires 508 and right tires 509 of the vehicle 100. The traction forces 501 and 502 are in opposite direction i.e., the front wheel is throttling, and the rear wheel is braking. This causes the wheels 508 and 509 to rotate from the default positions 503 and 504, respectively, into the positions 505 and 506, respectively. This causes the chassis 507 to drop (move in negative lift direction) as shown in FIG. 5.

Figure 6:
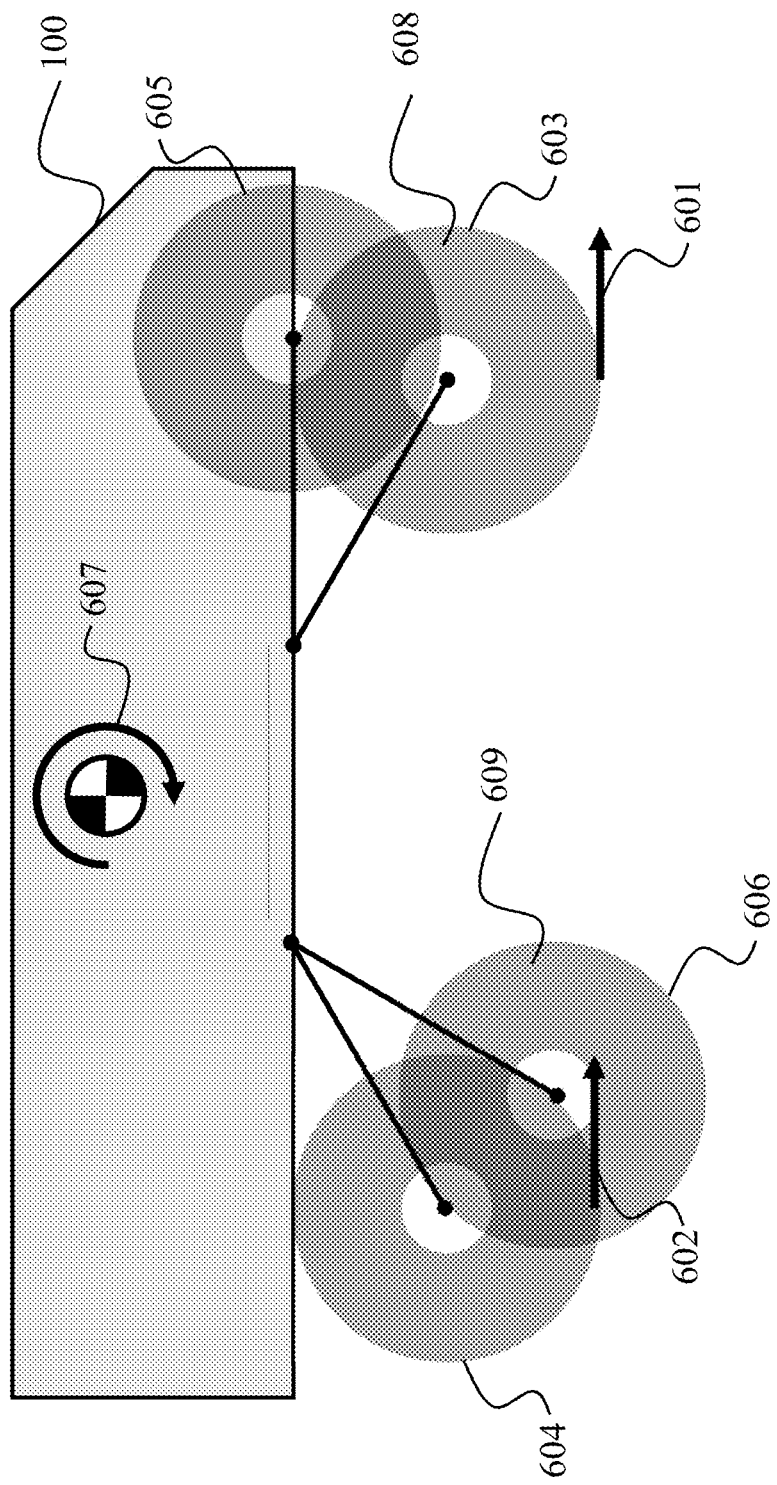
FIG. 6 shows effect of the throttle/brake forces applied to the front wheel and rear wheel of the vehicle, according to an example embodiment.

Another example of the lift and pitch motion in the pitch-plane is shown in FIG. 6.

FIG. 6 shows effect of the throttle/brake forces (601, 602) applied to the front wheel 608 and rear wheel 609 of the vehicle 100, according to an example embodiment. FIG. 6 is described in conjunction with FIG. 5. Similar to FIG. 5, FIG. 6 shows side view of the vehicle 100. In FIG. 6, the throttle/brake forces (also referred to as "traction forces") 601 and 602 are applied to the front wheel 608 and rear wheel 609. The front wheel 608 rotates forward from the default position 603 to 605 and the rear wheel 609 rotates backwards from the default position 604 to 606. This causes the chassis 607 to pitch forward as shown in FIG. 6. The forward pitching is in opposite direction to that of the natural backward pitching that the vehicle 100 undergoes during acceleration. This is called an anti-pitch effect. Analogous effects occur in all the three dimensions (i.e., not restricted to the pitch-plane).

Figure 7:
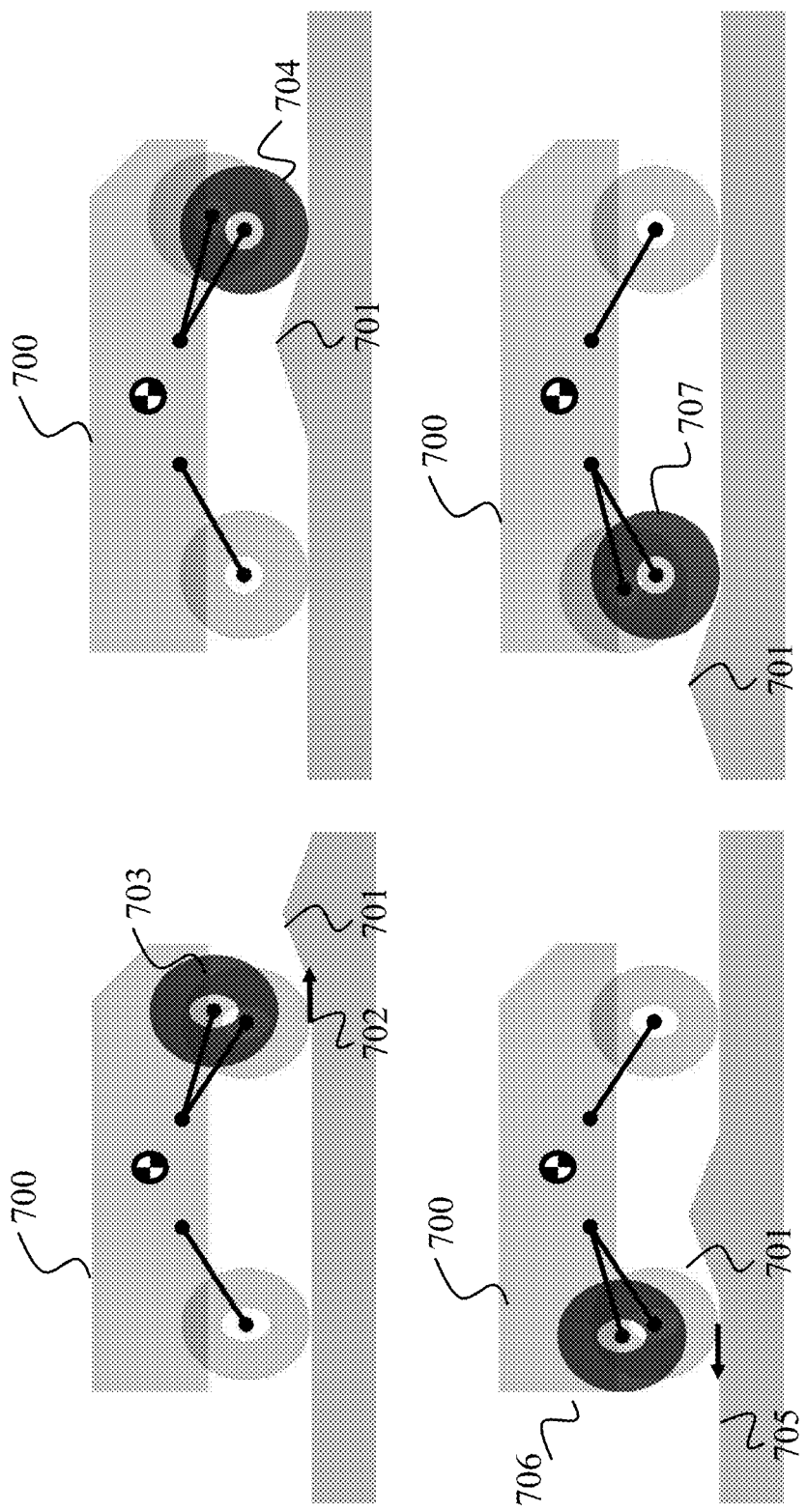
FIG. 7 shows execution of allocated traction forces to wheels of a vehicle to avoid chassis motion when driving over a bump on a road, according to an example embodiment.

FIG. 7 shows execution of allocated traction forces (702, 705) to wheels of a vehicle 700 to avoid chassis motion when driving over a bump 701 on a road, according to an example embodiment. The vehicle 700 comprises the VCS 200 (not shown in the FIG. 7). In FIG. 7, the VCS 200 allocates a traction force 702 on front wheels of the vehicle 700 that causes the front wheels to move from its default position 704 to a position 703 while the vehicle 700 is driving over the bump 701. After passing the bump 701, the front wheels move to their default position 704 from the position 703. Thus, the traction force 702 avoids motion of the chassis due to the front wheels passing over the bump 701.

Similarly, the VCS 200 allocates the traction force 705 on rear wheels of the vehicle 700 that causes the rear wheels to move from its default position 707 to a position 706 while the vehicle 700 is driving over the bump 701. After passing the bump 701, the rear wheels move to their default position 707 from the position 706. Thus, the traction force 705 avoids motion of the chassis due to the rear wheels passing over the bump 701.

Some embodiments are based on the realization that the vehicle dynamics are more complicated since the throttle/braking forces are not the only forces acting on the tires. The other forces such as sliding forces produced by the tires moving in the transverse direction are also acting on the tires of the vehicle 100.

Therefore, in some embodiments, a joint effect of the sliding forces and the traction forces onto the chassis is analyzed. To that end, a dynamical model (also referred to as "prediction model") of the vehicle 100 is used to predict the motion of the vehicle 100 and the subsequent motion of the chassis of the vehicle 100 in response to different combinations of the commands to the electric motors and steering. Further, the prediction model is used to jointly optimize the motion of the vehicle 100 and the motion of the chassis to achieve high drivability and high comfort by solving a suitable numerical problem in real-time to determine the optimal commands. To achieve this, the prediction model which is representative of the motion of the vehicle 100 and the motion of the chassis, which can be evaluated for real-time optimization is built.

Figure 9:
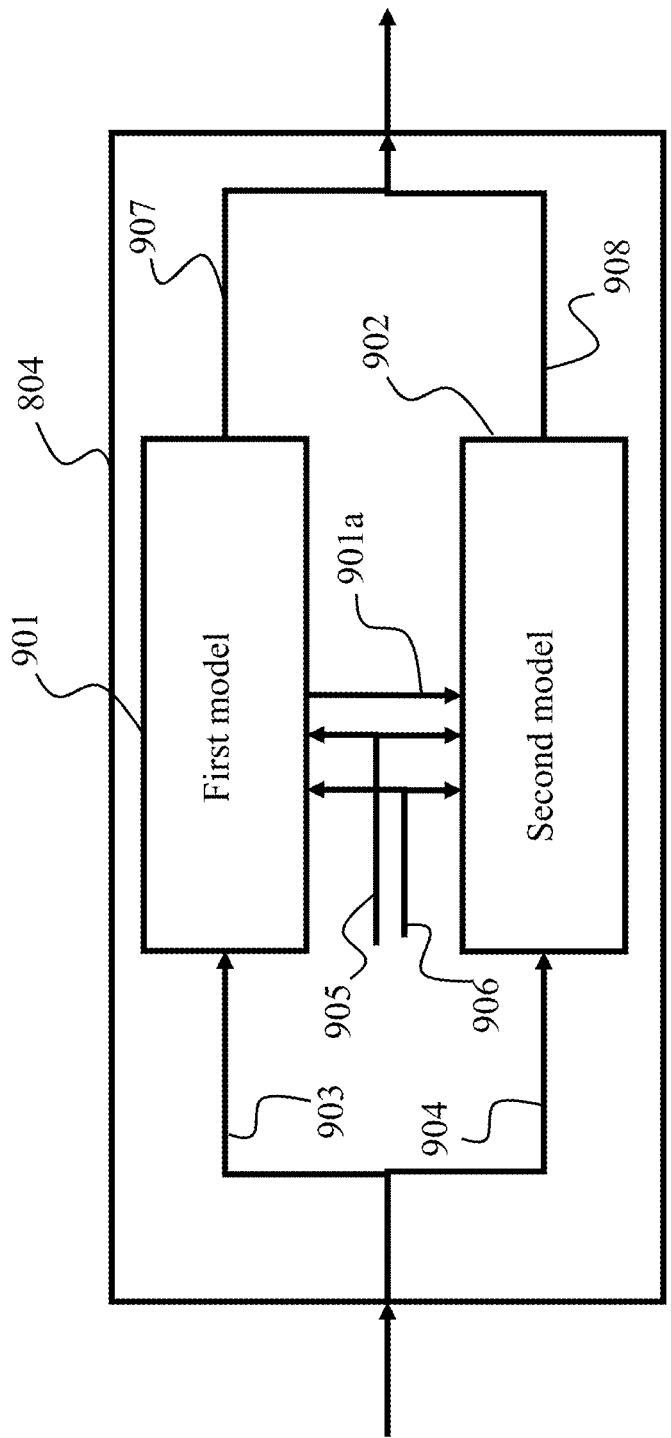
FIG. 9 shows a block diagram of the prediction model, according to an example embodiment.

The prediction model is described in further details with reference to FIG. 9.

Predictive Control Using the Prediction Model of Vehicle and Chassis Motion

Figure 8:
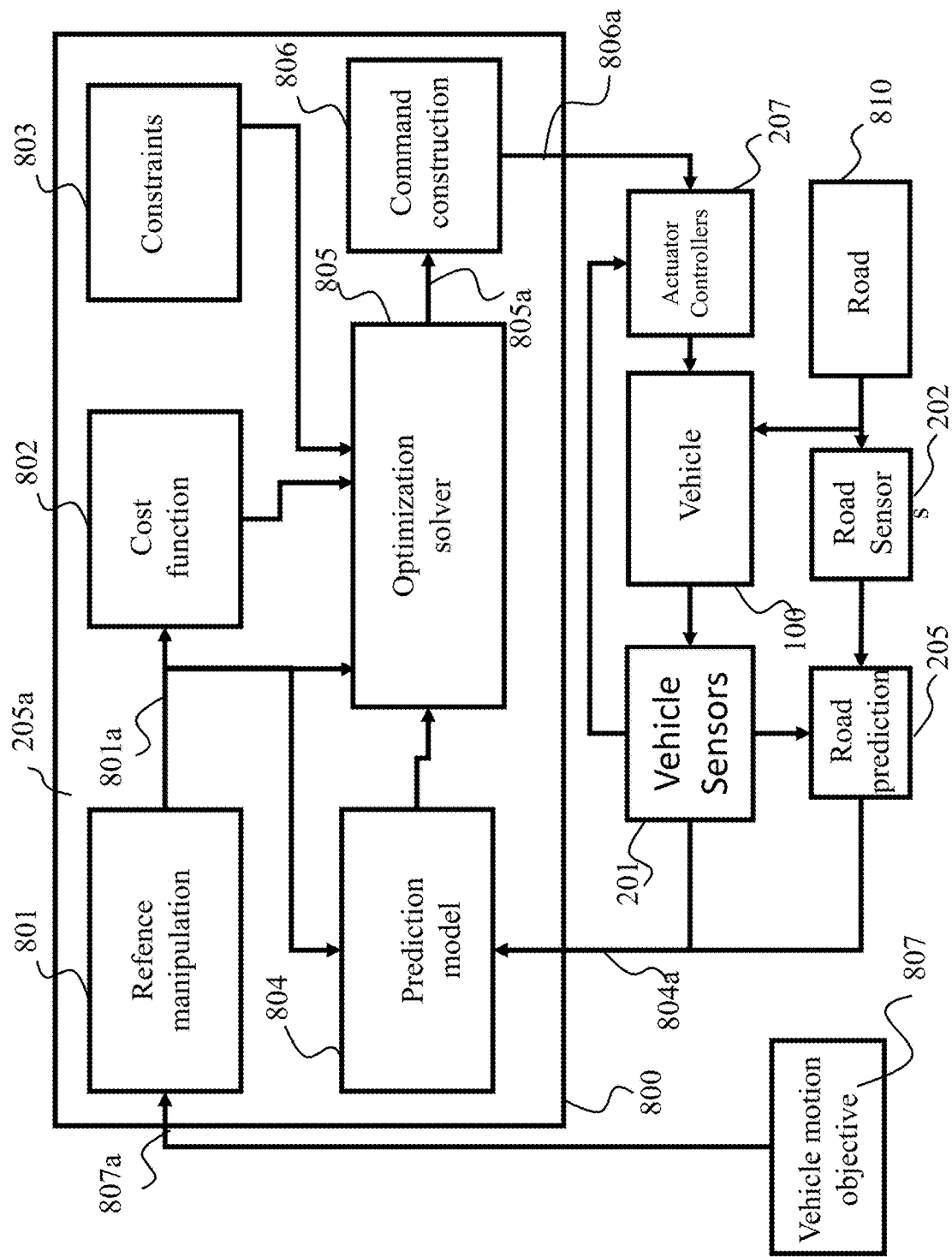
FIG. 8 shows a block diagram for controlling motion of the vehicle, according to an example embodiment.

FIG. 8 shows a block diagram 800 for controlling the motion of the vehicle 100, according to an example embodiment. The block diagram 800 is described below in conjunction with FIG. 2. The block diagram 800 is implemented in MSC 205a. The MSC 205a receives information 804a associated with the vehicle 100 and a road 810 on which the vehicle 100 is travelling from the vehicle sensors 201 and the road sensors 202, respectively, wherein sensor information obtained from the road sensor 202 is first processed by the road roughness prediction module 205b before providing to the MSC 205a. The information 804a is processed by a prediction model for the vehicle 804.

The MSC 205a further receives information 807a associated with an objective of a vehicle motion 807. The vehicle motion objective 807 is modified by a reference manipulation module 801 to ensure that the modified desired objective of the vehicle motion 801a does not cause issues, such as the loss of vehicle stability. The prediction model 804 extracts a state of the motion of the vehicle 100 and the motion of the chassis of the vehicle 100 from the information 804a and predicts the motion of the vehicle 100 corresponding to a possible sequence commands (also referred to as "command signals") from sequences of command signals to actuate motors and steering over a future prediction horizon. The MSC 205a further uses constraints 812 to determine the limitations to the motion of the vehicle 100 and to the possible sequence of commands to be applied to the vehicle 100.

Further, a cost function module (also referred to as "cost function") 802 is used to determine the desirability of the possible sequence of commands to be applied to the vehicle 100 by associating a score corresponding to each command of all the possible commands and corresponding behaviors of the vehicle motion. The behaviors of the vehicle motion corresponding to the sequence of commands are predicted by the prediction model 804 and evaluated based on at least one of: the current objective of the vehicle motion 807 or the modified objective of the vehicle motion 801a.

Further, the prediction model 804, the constraints 803, and the cost function 802 are used by an optimization solver module 805 to compute an optimal solution 805a that produces the best predicted behavior of the motion of the vehicle 100 according to the prediction model 804 and the cost function 802 while satisfying the constraints 803. The commands 806a for electric motors and steering are extracted by a command construction module 806 from the optimal solution 805a and applied to the vehicle 100 through the actuator controller 207 to obtain the motion of the vehicle 100 over a horizon possibly shorter than the prediction horizon as the predicted motion of the vehicle 100 according to the prediction model 804.

Some embodiments are based on the realization that to improve the drivability of the vehicle 100 by changing the vehicle state such that certain desired values are achieved while improving the comfort of the passenger by reducing the chassis motion, lift, roll, and pitch. For instance, the vehicle state is modified such that a desired yaw rate and acceleration are achieved, so that the longitudinal motion of the vehicle and the turning motion of the vehicle are as desired by a driver or an autonomous driving system. However, when such state modification occurs, the vehicle motion causes changes in pitch, roll, and lift, which the control system eliminates.

Some embodiments are based on the realization that since the drivability objective is to change the state to track time varying signals, and the comfort objective is to avoid changes to the states, two models to achieve two interconnected objectives (i.e., the drivability objective and the comfort objective) are used to construct the prediction model 804. The two models comprised by the prediction model 804 are a first model and a second model. The first model is used to describe the vehicle motion, and the second model is used to describe the chassis motion, such that the different specifications can be implemented on the different models.

FIG. 9 shows a block diagram of the prediction model 804, according to an example embodiment. The prediction model 804 comprises two sub-models: the first model 901 and the second model 902. To obtain a full prediction model that can be used for prediction and optimization in a real-time controller, the first model 901 is built as a primary model and the second model 902 is built as a secondary model.

To that end, the first model 901 is built such that its variables influence the changes of the variables of the second model 902, while the second model 902 is built such that its variables do not influence the changes of the variables described on the first model 901, but only the constraints limiting the variables in the first model 901.

The first model 901 predicts the motion of the vehicle 100. Thus, the first model 901 is used to predict the objective of drivability, that is, to achieve the desired change of state of the vehicle motion. The first model 901 includes the longitudinal acceleration $a_x$ that is represented by equation (1):

$$Ma_x = \sum_{i=l,r}(u_{fi}\beta + C_j^\alpha \alpha_f)\delta + \sum_{j=f,r}(u_{ji} - C_j^\alpha \alpha_j \beta) \quad (1)$$

where $j \in \{f, r\}$, $i \in \{l, r\}$, denotes the front and rear, and left and right tires, M denotes the mass of the chassis (sprung mass), $\beta$ is the body slip angle, $\alpha_j$ is the tire slip angle, $C_j^a$ is the tire cornering stiffness, $u_{ji}$ are the motor traction forces and $\delta$ the steering angle.

The body slip angles, and the tire slip angles are $$\beta = \tan^{-1}\frac{v_y}{v_x}, \quad \alpha_f = \beta + \frac{b_f}{v_x}\dot\psi - \delta, \quad \alpha_r = \beta + \frac{b_r}{v_x}\dot\psi, \quad (2)$$

where $b_f$, $b_r$ are front/rear wheel base, that is the longitudinal distance from vehicle center of gravity (CG) to front/rear tires the wheel base, $v_x$ is the longitudinal velocity, $v_y$ is the lateral velocity, $\dot\psi$ is the yaw rate.

The first model 901 also includes dynamics of the body slip angle represented by $$v_x\dot\beta = -v_x\dot\psi - a_x\beta + \frac{1}{M}\sum_{i=l,r}\left(u_{fi}\delta - \sum_{j=f,r}C_j^\alpha \alpha_j\right) \quad (3)$$

and the dynamics of the yaw rate represented by $$J_Z\ddot\psi = \sum_{i=l,r}b_f u_{fi}\delta - \sum_{j=f,r}(b_j C_j^\alpha \alpha_j + L_{ji}u_{ji}), \quad (4)$$

where $L_f$, $L_r$ are front/rear track width, the lateral distance between left and right wheels in the front and rear of the vehicle, $J_X$, $J_Y$, $J_Z$ are the moments of inertia of the chassis about the x, y and z direction, the roll, pitch, and yaw moments of inertia. Thus, the first model 901 is constructed based on equations (1)-(4). Further, the state vector of the first model 901 (also referred to as "the state of the first model 901") contains the body slip and the yaw rate, $x^1 = [\beta\dot\psi]^T$, from which the lateral velocity and the tire slip angles are determined. However, the longitudinal acceleration is a static function, so it does not need state variables.

The second model 902 predicts the motion of the chassis. Hence, the second model 902 is used to predict the objective of comfort, that is, to achieve a reduction of the motion of the chassis. The vertical motion or lift z of the chassis is represented by $$M\ddot z = -\sum_{i,j}(K_{ji}(z - b_j\theta) + C_{ji}(\dot z - b_j\dot\theta)) \quad (5)$$

$$-\sum_{i,j}(\text{sign}(b_j)\gamma_j u_{ji} + \gamma_f C_f \alpha_f \delta)$$

$$-\sum_{i=l,r}\text{sign}(L_{fi})\eta_j u_{fi}\delta + \sum_{i,j}(K_{ji}d_{ji} + C_{ji}\dot d_{ji})$$

where $K_{ij}$, $C_{ij}$, are the spring stiffness and damping ratio of each of the suspension assemblies $d_{ij}$ is the road height at each tire with respect to the nominal (rest condition) $\gamma_j$, is the anti-dive/squat angle of the side-view trailing arm, $\eta_j$ is the angle between the trailing arm and the ground in the roll plane.

The pitch motion $\theta$ of the chassis is represented by $$J_Y \ddot{\theta} = \sum_{i,j} K_{ji} b_j (z - b_j \theta) + C_{ji} b_j (\dot{z} - b_j \dot{\theta}) \qquad (6)$$
$$+ \sum_j (\gamma_j (|b_j| - a_j) - h + h_j) \left( C_f^\alpha \alpha_f + \sum_i u_{ji} \right)$$
$$+ \sum_{i=l,r} b_f \operatorname{sign}(L_{fi}) \eta_f u_{fi} \delta - \sum_{i,j} K_{ji} b_j d_{ji} - C_{ji} b_j \dot{d}_{ji}$$

where $a_j$ is the longitudinal distance between the wheel contact point and the pitch-plane trailing arm mounting point, $h_j$, is the height of the pitch-plane trailing arm mounting point, h is the height of CG to the ground when vehicle 100 is stationary.

The roll motion $\phi$ of the chassis is represented by $$J_X \ddot{\phi} = -\sum_{i,j} (K_{ji} L_{ji}^2 \phi + C_{ji} L_{ji}^2 \dot{\phi}) \qquad (7)$$
$$- \sum_i (\operatorname{sign}(b_j) \gamma_j L_{ji} u_{ji} + (h - h_j) C_j^\alpha \alpha_j)$$
$$+ \sum_{i,j} K_{ji} L_{ji} d_{ji} + C_{ji} L_{ji} \dot{d}_{ji}$$

Thus, the second model 902 is constructed based on equations (5)-(7). Further, the state vector of the second model 902 (also referred to as "state of the second model 902") contains the pitch, roll, and lift, and their rates, $x^2 = [z \dot{z} \theta \dot{\theta} \phi \dot{\phi}]^T$.

Thus, as shown schematically in FIG. 9, the state of the vehicle 100 and the road is decomposed into a first state 903 of the first model 901 and a second state 904 of the second model 902. In the first model 901, the tire slip angle $\alpha_j$, which is determined by the body slip angle, the longitudinal velocity, and the lateral velocity, affects 901a the state of the second model 902. Thus, the change of the state of the second model 902 is dependent on the state of the first model 901.

On the other hand, the changes of the state of the first model 901 do not depend on the state of the second model 902. Further, the motor traction forces $u_{ji}$ 905 and the steering angle $\beta$ 906 affect both the first model 901 and the second model 902, simultaneously. The changed states 907 of the first model 901 and the changed states 908 of the second model 902 are combined to obtain the changed state of the prediction model 804 (also referred to as "full prediction model").

While the state of the second model 902 does not affect the change of the state of the first model 901, the state of the second model 902 affects constraints on the states of the first model 901, $$u_{ji}^2 + (C_j^\alpha \alpha_j)^2 \leq (\mu N_{ji})^2, \qquad (8)$$

that limit the traction force and the tire slip angle at each wheel by the vertical load at such wheel $N_{ji}$, where the vertical loads are affected by the state of the second model 902

$$N_{fi} = \bar{N}_f - K_{fi}(z - b_f \theta + L_{fi} \phi - d_{fi}) \qquad (9)$$
$$- C_{fi}(\dot{z} - b_f \dot{\theta} + L_{fi} \dot{\phi} - \dot{d}_{fi})$$
$$- \gamma_f (u_{fi} + C_f^\alpha \alpha_f \delta) + \operatorname{sign}(L_{fi}) \eta_f (u_{fi} \delta + C_f^\alpha \alpha_f)$$
$$N_{ri} = \bar{N}_r - K_{ri}(z + b_r \theta + L_{ri} \phi - d_{ri})$$
$$- C_r(\dot{z} + b_r \dot{\theta} + L_{ri} \dot{\phi} - \dot{d}_{ri}) \quad ,$$
$$+ \gamma_r u_{ri} + \operatorname{sign}(L_{ri}) \eta_r C_r^\alpha \alpha_r$$

In some embodiments of the present disclosure, the first model 901 is also affected by additional constraints such as limits on the body slip angle, tire slip angles, yaw rate and the likes:

$$|\beta| \leq \beta^{max}, |\dot{\psi}| \leq \dot{\psi}^{max}, |\alpha_f| \leq \alpha_f^{max}, |\alpha_r| \leq \alpha_r^{max} \qquad (10)$$

In some embodiments, the motor traction forces and steering angles are also subject to limits:

$$|u_{ji}| \leq u_{ji}^{max}, |\delta| \leq \delta^{max} \qquad (11)$$

To obtain the prediction model 804 that is amenable to real-time computations, the first model 901 is obtained by linearizing equations (1)-(4) with respect to the current conditions of longitudinal velocity and acceleration $\rho = [v_x, a_x]$, $x_{t+1}^1 = A^1(\rho) x_t^1 + B^1(\rho) u_t + w_t^1$ $$y_t^1 = C^1(\rho) x_t^1 + D^1(\rho) u_t, \qquad (12)$$

where $u = [u_{fl} \; u_{fr} \; u_{rl} \; u_{rr} \; \delta]^T$ is the input vector that contains the motor forces and the steering angle, while w is a vector representing the error in linearization which belongs to a known bounded set $w \in \mathcal{W}$.

In some embodiments, the first model 901 is further modified to more effectively handle the tracking objective of the drivability. For instance, the first model 901 is differentiated to obtain a velocity-form model $$\xi_{t+1}^1 = \begin{bmatrix} \Delta x_{t+1}^1 \\ e_{t+1}^1 \end{bmatrix} = \begin{bmatrix} A^1(\rho) & 0 \\ C^1(\rho) & I \end{bmatrix} \begin{bmatrix} \Delta x_t^1 \\ e_t^1 \end{bmatrix} + \begin{bmatrix} B^1(\rho) \\ D^1(\rho) \end{bmatrix} \Delta u_t + \begin{bmatrix} I \\ 0 \end{bmatrix} \Delta w_t + \begin{bmatrix} 0 \\ I \end{bmatrix} \Delta r_t, \qquad (13)$$

where for a vector a, $\Delta a_t = a_t - a_{t-1}$, $e_t = [a_x - a_x^r \; \dot{\psi} - \dot{\psi}^r]^T$ is the tracking error of the desired values for the longitudinal acceleration and yaw rate, $\Delta r_t = [a_{x,t}^r - a_{x,t-1}^r \; \dot{\psi}_t^r - \dot{\psi}_{t-1}^r]^T$, and $a_x^r$, $\dot{\psi}^r$ are in the longitudinal acceleration and yaw rate references to be tracked by the first model 901. In some embodiments, the state of the first model 901 is recovered from the velocity form to enforce constraints (8)-(11) on the state of the first model 901 by a linear mapping $$\begin{bmatrix} x_k^d \\ \delta_{k-1} \end{bmatrix} = C^*(\rho) \begin{bmatrix} \xi_k^d \\ \dot{\psi}^r \end{bmatrix}, \qquad (14)$$

In some embodiments, the second model 902 is obtained by linearizing equations (5)-(7)

$x_{t+1}^2 = A^2(\rho) x_t^2 + B^2(\rho) u_t^1 + B_d^2 d_t$ $$y_t^2 = C^2(\rho) x_t^2 + D^2(\rho) u_t, \qquad (15)$$

where d collects all road heights at the wheels and their rates. In the preferred embodiment, the second model 902 is maintained in its current form, called amplitude form. In some embodiments, the second model 902 is also transformed in velocity form.

Some embodiments form the prediction model 804 by collecting the first model 901 and the second model 902, where the velocity form is used for the first model 901. In another embodiment, the velocity form is used for the first model 901 and the second model 902, to obtain the full prediction model 804:

$$\xi_{t+1} = \mathcal{A}(\rho)\xi_t + \mathcal{B}(\rho)\bar{u}_t - \mathcal{B}_d\bar{d}_t - \mathcal{B}_w\bar{w}_t - \mathcal{B}_r\bar{r}_t \tag{16}$$

where $\xi$, $\bar{u}_t$, $\bar{d}_t$, $\bar{w}_t$, $\bar{r}_t$ an input vector, a road disturbance vector, a linearization error vector, and a reference target vector in the full prediction model.

Constraints on the Prediction Model

Figure 10:
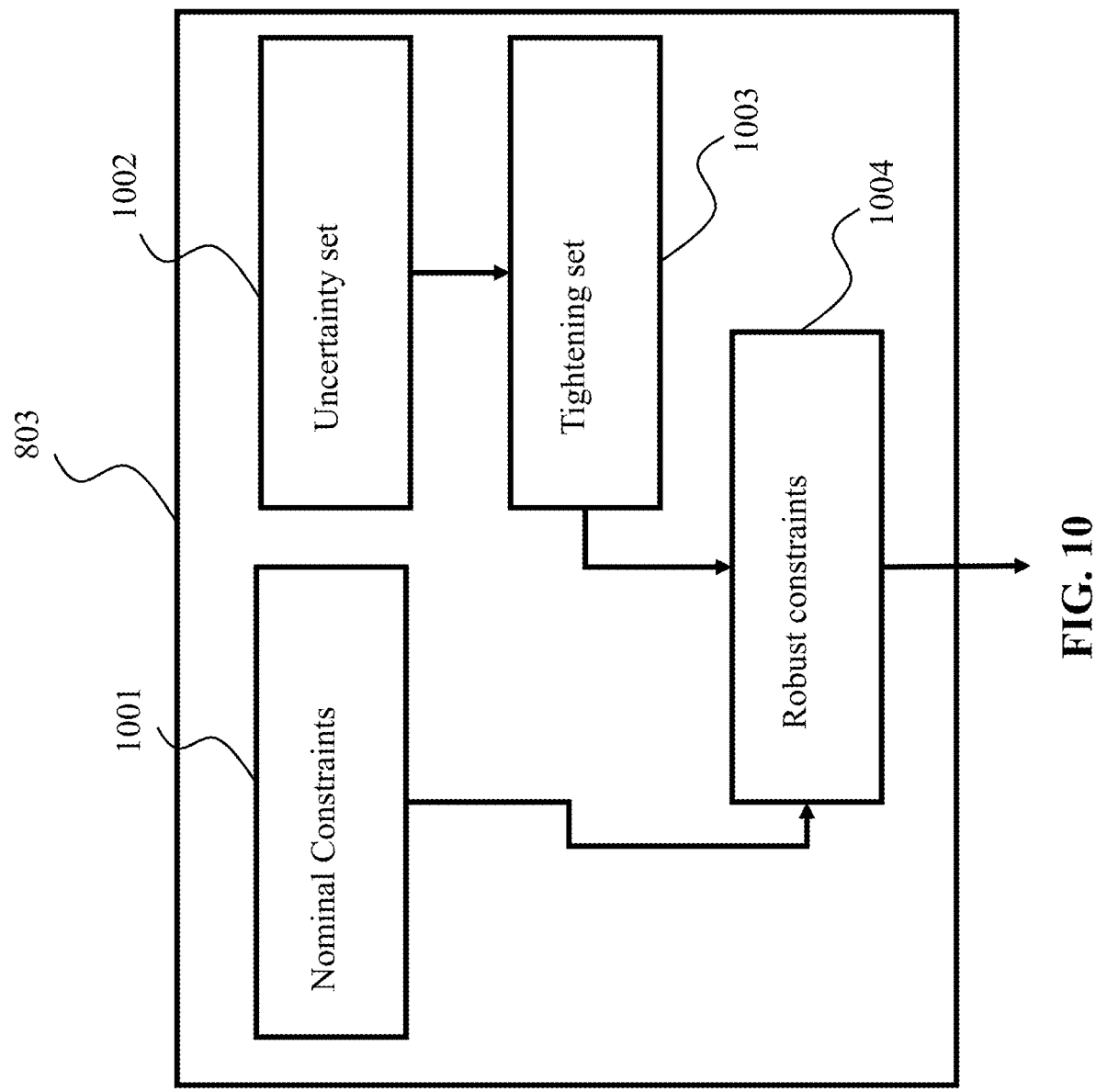
FIG. 10 shows is a block diagram of the constraints of a motor and steering control (MSC) system, according to an example embodiment.

In some embodiments, the constraints 803 on the full prediction model 804 are constructed based on equations (8)-(11) and (14), FIG. 10 shows is a block diagram of the constraints 803 of the MSC system 205a, according to an example embodiment. The constraints 803 are used to achieve drivability and comfort by commanding electric motors and steering angle, where the constraints 803 are constructed from nominal constraints and a tightening set derived from an uncertainty set. As shown in FIG. 10, the constraint 803 comprises robust constraints 1004 constructed based on equation (17):

$$H_\xi(\rho)\xi_t + H_v(\rho)\bar{u}_t + H_r(\rho)\bar{r}_t \leq K(\rho) \tag{17}$$

Further, the constraints 803 comprises nominal constraints 1001 constructed based on equations (8)-(11), and then robust constraints based on a tightening set 1003, where the tightening set 1003 is constructed based on an uncertainty set 1002 which is based on the set bounding the linearization error $\mathcal{W}$, where the linearization error corresponds to a difference between the motion of the vehicle 100 predicted by the first model 901 and the actual motion of the vehicle 100. In some embodiments, the tightening set 1003 is constructed as a disturbance invariant set that is a set $\mathcal{T}$ such that $$\delta \in \mathcal{T} \Longrightarrow f(\delta(t), w(t)) \in \mathcal{T}, \forall_w \in \mathcal{W} \tag{18}$$

where f is the first model 901 constructed based on equation (12). Thus, the set $\mathcal{T}$ is a set of states such that for any state in the set $\mathcal{T}$, the updated state according to the first model 901 remains in the same set, for any uncertainty in the set $\mathcal{W}$ applied.

Figure 11:
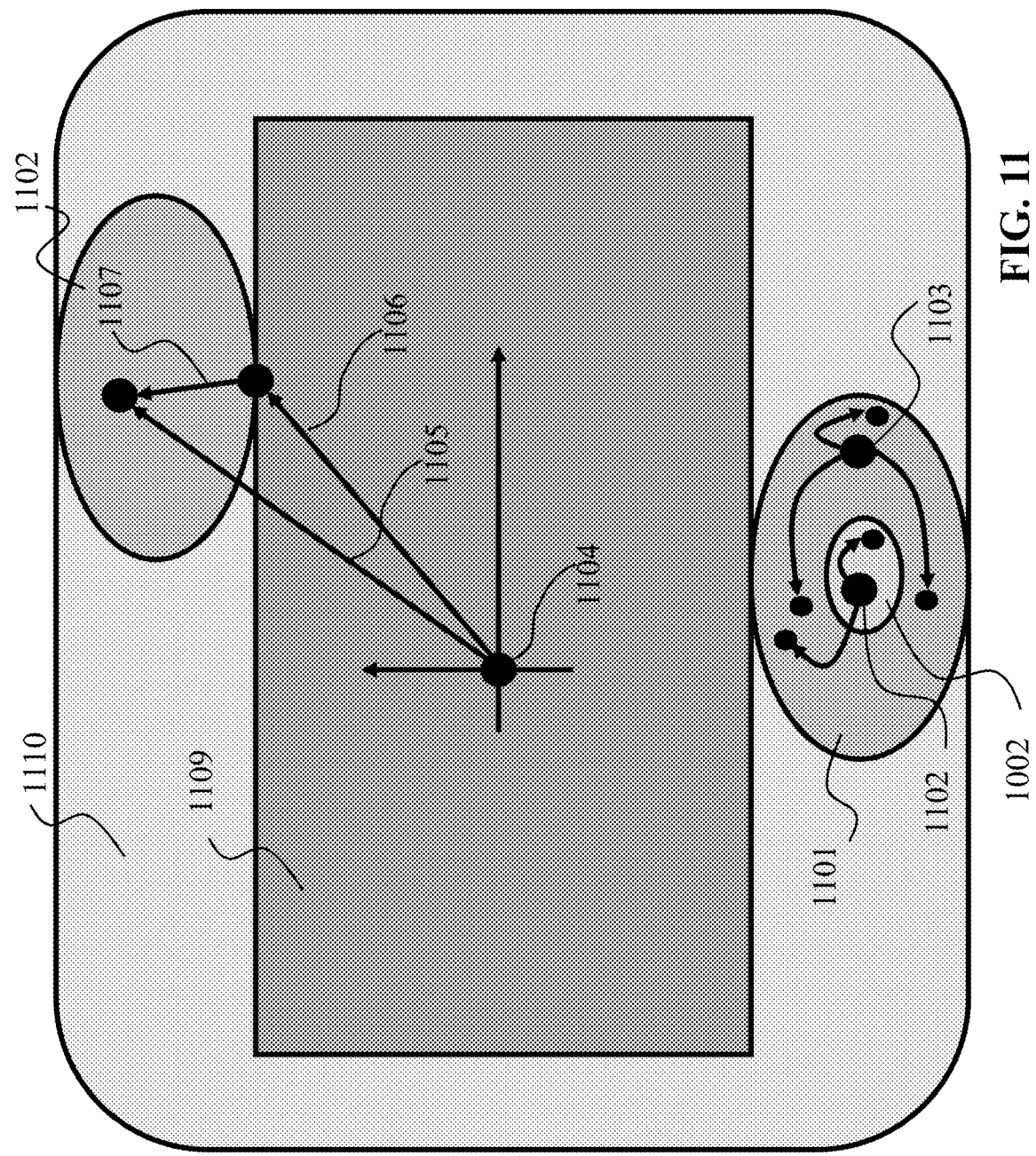
FIG. 11 shows a schematic of constructing robust constraints from nominal constraints and uncertainty set, according to an example embodiment

FIG. 11 shows a schematic of constructing robust constraints 1004 from nominal constraints 1001 and uncertainty set 1002, according to an example embodiment. From the uncertainty set $\mathcal{W}$ 1002, a tightening set $\mathcal{T}$ 1101 is constructed as an invariant set of the first model 901 containing the uncertainty set $\mathcal{W}$ 1002. Thus, for a state 1102 inside the uncertainty set $\mathcal{W}$ 1002, the updated state according to the first model 901 for some admissible value of the uncertainty w is outside of the uncertainty set $\mathcal{W}$ 1002. However, for every state 1103 in the tightening set $\mathcal{T}$ 1101, the updated state according to the first model 901 for any admissible value of the uncertainty w is still inside the tightening set $\mathcal{T}$ 1101.

Further, with respect to an origin 1104, which is arbitrarily chosen, the region 1110 determined by the admissibility of the nominal constraints equations (8)-(11) is shrunk by the tightening set $\mathcal{T}$ 1101 to obtain a region 1109 determined by the admissibility of the robust constraints 1004 such that every state in the region 1110, such as state 1105, is decomposed into a first component of the state 1106 contained into the region 1109 determining the admissibility of the robust constraints 1004 and a second component of the state 1107 contained into the tightening set $\mathcal{T}$ 1101, appropriately translated. Thus, enforcing the robust constraints (17) onto the first component of the state 1106, which is computed from equation (12) for $w^1 = 0$, or from equation (16) for $\bar{w} = 0$, ensures that the state 1105 rests inside the nominal constraints 1001.

Further, to reduce the size of the tightening set $\mathcal{T}$ 1101, some embodiments of the present disclosure modify the prediction model 804 by adding a stabilizing gain (also referred to as "feedback gain"), where the signal upon which the feedback gain operates is determined based on a difference between the motion of the vehicle and a motion predicted by the first model 901

$$u_s = \mathcal{F}(\xi_t - \xi_t^*), \tag{19}$$

where $\xi$ is the actual full state of the prediction model and is the nominal full state of the prediction model. Further, the constraints on the motor forces and steering are tightened based on the feedback gain $\mathcal{F}$. In some embodiments of the present disclosure, the feedback gain (equation (20)) is computed to minimize the worst-case infinite horizon linear quadratic cost considering only the first model 901, which results in a proportional integral controller:

$$u_t = F_x x_t^1 + F_e \Sigma_{k=0}^t e_k \tag{20}$$

Manipulation of Reference for Stability Control

Some embodiments are based on the realization that if the driver or the autonomous driving system requests changes to the vehicle states that are excessively aggressive, the vehicle 100 loses stability, that is, the vehicle 100 enters a spin. To avoid the loss of stability of the vehicle 100, the VCS 200 enforces the constraints 803. However, setting the desired vehicle state to aggressively high or aggressively low makes it difficult for the VCS 200 to satisfy the constraints 803.

Some embodiments are based on the realization that the MSC 801 ensures stability of the vehicle 100 by manipulating 801 the desired state of the vehicle 100 together with determining the motor forces and steering angle to achieve it, while penalizing the deviations from the desired state requested by the driver or autonomous driving system.

In some embodiments, the MSC system 205a selects the desired state for the yaw rate to be admissible, by evaluating whether the combination of the current state of the first model and the desired yaw rate belongs to a set $\mathcal{O}$ $$(x^1, \dot{\psi}^r) \in \mathcal{O} \tag{21}$$

The set $\mathcal{O}$ is such that for every current state of the first model 901 and the desired yaw rate in $\mathcal{O}$ the constraints (10), (11) are satisfied, where constraint (11) is applied to the feedback gain, for instance in equation (20). The set $\mathcal{O}$ is also invariant for $f_{cl}^1(x^1)$ which is the first model 901 and the feedback gain such as (20), $$(x^1, \dot{\psi}^r) \in \mathcal{O} \Longrightarrow (f_{cl}^1(x^1), \dot{\psi}^r) \in \mathcal{O} \tag{22}$$

that is, if the combination of the current state of the first model 901 and the desired yaw rate belongs to $\mathcal{O}$, the updated state of the first model 901 based on the equation (12) and the feedback gain equation (20), and the same desired yaw rate still belong to the set $\mathcal{O}$.

Cost Function for Achieving Drivability and Comfort

The cost function 802 determines which sequence of command signals among the sequences of command signals satisfies the constraints 803 is to be chosen.

Figure 12:
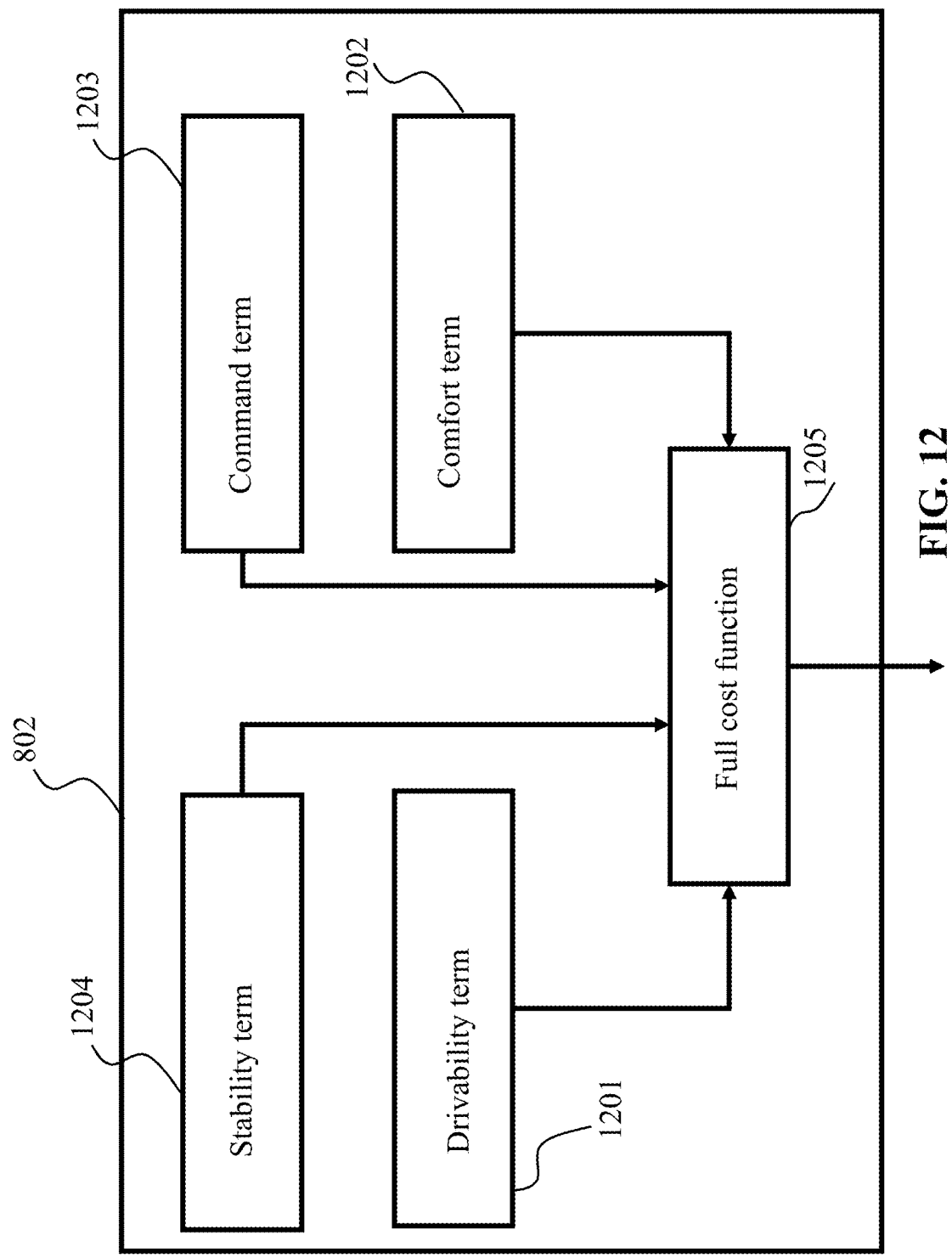
FIG. 12 shows a block diagram of the cost function module of the MSC system, according to an example embodiment

FIG. 12 shows a block diagram of the cost function module 802 of the MSC system 205a, according to an example embodiment. The cost function 802 is used to evaluate sequence of commands for electric motors and steering angle of the vehicle 100 to achieve the drivability objective and the comfort objective, where the cost function 802 is includes multiple terms. As described in FIG. 12, in some embodiments of the present disclosure, the cost function 802 is a full cost function 1205 constructed from multiple terms.

The drivability term 1201 indicates to choose sequence of commands for motor forces and steering that achieve the drivability of the vehicle 100, that is, that make the vehicle state change to achieve the desired vehicle state.

In some embodiments, the desired state consists of a desired yaw rate and longitudinal acceleration $a_x^r$, $\dot{\psi}^r$. Thus, the cost function includes a sum over a future horizon of N discrete-time steps sampled with time $T_s$ from current time t of $e_t$ $$\sum_{k=0}^{N-1} e_{t+k}^T W_e e_{t+k},$$

where $W_e$ is a positive semidefinite matrix of weights.

Further, a comfort term 1202 indicates to choose sequence of commands for motor forces and steering that achieve comfort for the passenger in the vehicle chassis. To that end, quadratic deviations of pitch, roll, lift and their rates from 0, summed over a future horizon of N discrete-time steps sampled with time $T_s$ from current time t are penalized by terms in the cost function that cause an increase in the cost if the pitch, roll, lift and their rates deviate from 0

$$\sum_{k=0}^{N-1} w_{z1} z_{t+k}^2 + w_{z2} \dot{z}_{t+k}^2 + w_{\theta 1} \theta_{t+k}^2 + w_{\theta 2} \dot{\theta}_{t+k}^2 + w_{\psi 1} \psi_{t+k}^2 + w_{\psi 2} \dot{\psi}_{t+k}^2$$

where $w_{z1}$, $w_{z2}$, $w_{\theta 1}$, $w_{\theta 2}$, $w_{\psi 1}$, $w_{\psi 2}$ are non-negative scalar weights.

In some embodiments, pitch, roll, lift jerks, i.e., second derivatives, are also added to the cost function 802.

Further, the cost function 802 includes a command term 1203, which aims at reducing the control effort. In some embodiments, the command term 1203 includes terms that penalize input changes over a future horizon of N discrete-time steps sampled with time $T_s$ from current time t $$\sum_{k=0}^{N-1} \Delta u_{t+k}^T W_{\Delta u} \Delta u_{t+k}$$

where $W_{\Delta u}$ is a positive semidefinite matrix of weights.

In some embodiments, the command term 1203 further includes a first cost term for penalizing the amplitude of the command with respect to a desired steady state over a future horizon of N discrete-time steps sampled with time $T_s$ from current time t $$\sum_{k=0}^{N-1} (u_{t+k} - u_\infty)^T W_u (u_{t+k} - u_\infty)$$

where $W_u$ is a positive semidefinite matrix of weights. The amplitude of the command signal is penalized by increasing the first cost term when the amplitude of the command signal deviates from zero.

In some embodiments, the command term 1203 further includes a second cost term for penalizing a rate of change of the command signal to the plurality of electric motors and the steering wheel. The rate of change of the command signal to the plurality of electric motors and the steering wheel are penalized by increasing the second cost term when the rate of change of the command signal to the plurality of electric motors and the steering wheel deviate from zero Some embodiments are based on the recognition that multiple steady states are possible because the objective of tracking only determines two equilibrium conditions (for the drivability objective and the comfort objective) based on five available control signals (four electric motors and the steering angle). In some embodiments, additional steady state objective is added on the control signal amplitude. For instance, a desired steady state steering angle is determined as a linear function of the desired yaw rate $\delta_\infty = K_{\delta \dot{\psi}}^{-1} \dot{\psi}^r$, where the linear gain is the inverse of a dc-gain from steering to yaw rate of the first model 901.

In some embodiments, steady states of the forces are determined from the desired acceleration, such that the left tire and the right tire forces are equal and the front tire and the rear tire forces are distributed according to the nominal tire force distribution, which is based on the ratio of the front and rear wheelbases $b_f$, $b_r$ with respect to the total wheelbase $b = b_f + b_r$, $$u_{fi,\infty} = \frac{|b_r|}{2 \sum_j |b_j|} M a_x^r \quad u_{ri,\infty} = \frac{|b_f|}{2 \sum_j |b_j|} M a_x^r$$

The constraints 802 further include a stabilization term (also referred to as "stability term") 1204 for penalizing changes of the desired state of the vehicle 100 to ensure that the desired state of the vehicle 100 does not cause infeasibility.

To that end, a modified desired yaw rate $\dot{\varphi}_t^r$ is used in computing the tracking error $e_t$. The modified desired yaw rate is selected such that the current state of the first model 901 and the modified desired yaw rate satisfy constraint (21), $(x_t^1, \dot{\varphi}_t^r) \in \mathcal{O}$, and the square of the deviation of the modified desired yaw rate from the actual desired yaw rate is penalized by the stabilization term 1204.

For instance, the squared value of the deviation of the modified desired yaw-rate with $w_T (\dot{\varphi}_t^r)^2$ where $W_T$ is a nonnegative weight.

In some embodiments, additional terms are added for penalizing the state of the prediction model (16) during the N steps future horizon (also referred to as "future prediction horizon") and at the end of such prediction horizon.

Some embodiments group all the terms of the cost function 802 as $$\|\dot{\varphi}_t^r - \dot{\psi}_t^r\|_T^2 + \|\xi_{N|t}\|_P^2 + \sum_{k=0}^{N-1} \left( \|\xi_{k|t}\|_Q^2 + \|\Delta u_{k|t}\|_R^2 + \|u_{k|t} - u_\infty\|_{R_u}^2 \right) \quad (23)$$

where T, P, Q, R, $R_u$ are positive semidefinite matrix weight collecting all the term weights.

Real-time Optimization

Figure 13:
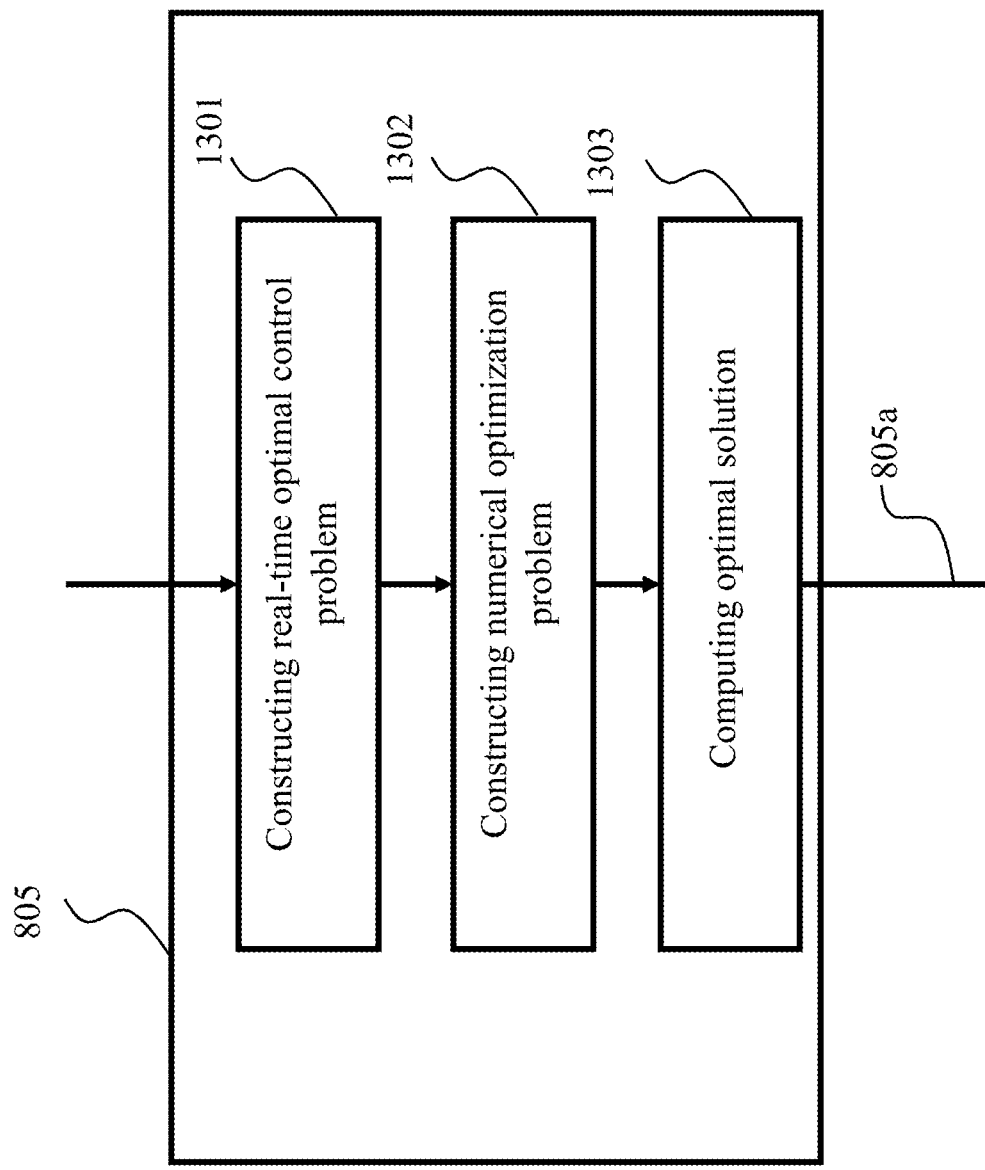
FIG. 13 shows a flow diagram of steps executed by the optimization solver module of the MSC system, according to an example embodiment

FIG. 13 shows a flow diagram of steps executed by the optimization solver module 805 of the MSC system 205$a$, according to an example embodiment. To achieve drivability and comfort, the optimization solver module 805 is configured to command electric motors and steering angle to compute optimal actions over a future horizon. As shown in FIG. 13, the optimization solver module 805 collects all the information on the prediction model (16) 804, the constraints (17) 803, the reference manipulation (22) 801, the cost function (23) 802, and constructs at step 1301, a real-time optimal control problem over a future horizon of N steps from current time step t with sampling period $T_s$, $$\min_{\Delta U_t, \xi_{0|t}, \dot{\varphi}_t^r} \quad \|\dot{\varphi}_t^r - \dot{\psi}_t^r\|_T^2 + \|\xi_{N|t}\|_P^2 + \sum_{k=0}^{N-1} \left( \|\xi_{k|t}\|_Q^2 + \|\Delta u_{k|t}\|_R^2 + \|u_{k|t} - u_\infty\|_{R_u}^2 \right) \quad (24)$$

$$\text{s.t.} \quad (x_{0|t}^1 - x_t^1) \in \mathcal{T}, \; x_{0|t}^2 = x_t^2$$

$$\xi_{k+1|t} = \mathcal{A}(\rho) \xi_{k|t} + \mathcal{B}(\rho) \Delta u_{k|t} + \mathcal{B}_d \Delta d_{k|t}$$

$$H_\xi(\rho) \xi_t + H_v(\rho) \bar{u}_t + H_r(\rho) \bar{r}_t \leq K(\rho)$$

$$(x_{N|t}^1, \dot{\varphi}_t^r) \in \mathcal{O}$$

where the decision variables are the commands to the electric motors, and the steering angle changes along the future horizon $\Delta U_t$, the initial state $\xi_{0|t}$, subject to constraints on the state of the first model 901 due to the invariant set $\mathcal{T}$ and the current state of the second model 902, and the modified desired state of the vehicle 100, such as the modified desired yaw rate $\dot{\varphi}_t^r$.

At step 1302, transforming the optimal control problem represented by equation (24) into a numerical optimization problem, using procedures such as collocation, shooting, or state elimination $$\min_\chi \quad F_0(\chi) \quad (25)$$

$$\text{s.t.} \quad F_1(\chi) \leq 0$$

$$F_2(\chi) = 0$$

with a cost function, inequality constraints, and equality constraints, where $\chi$ is the vector of decision variables, which contains the input changes along the prediction horizon, the initial state, and the modified desired state of the vehicle 100.

In some embodiments of the present disclosure, the numerical optimization problem is a quadratic program $$\min_\chi \quad \chi^T Q_\chi \chi + c_\chi \chi \quad (26)$$

$$\text{s.t.} \quad H_\chi^i \chi \leq K_\chi^i \chi$$

$$H_\chi^e \chi = K_\chi^e \chi$$

At step 1303, the optimal solution 805$a$ is computed by solving the numerical optimization problem (25) using at least one of the methods such as gradient-based optimization, derivative-free optimization, global-search. In some embodiments, the solution (23) for the problem (26) is computed by using alternative direction method of multipliers (ADMM), active set, interior point, fast gradient.

Construction of the Motors and Steering Commands

Figure 14:
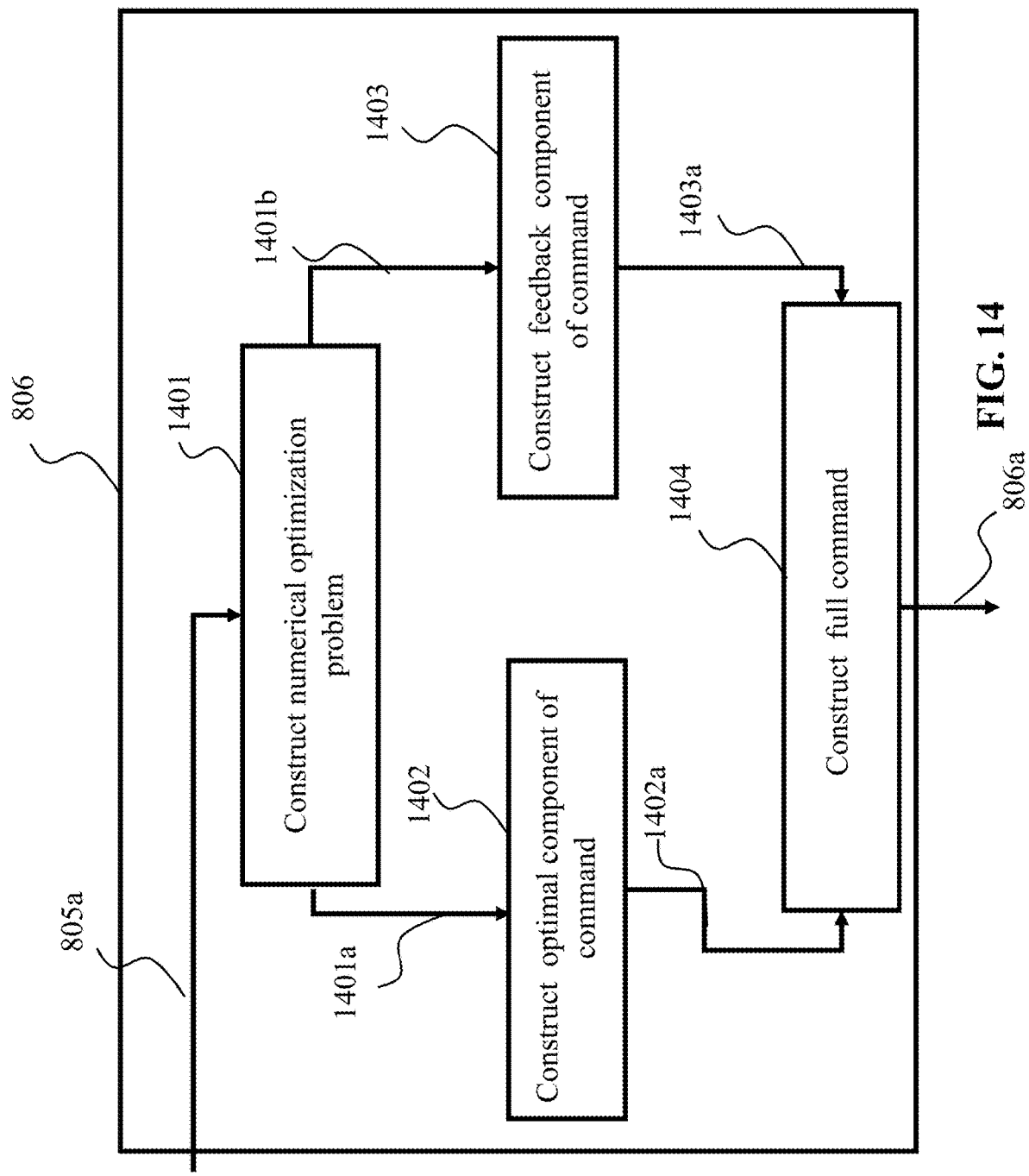
FIG. 14 shows a flow diagram of the command construction module of the MSC system, according to an example embodiment.

FIG. 14 shows a flow diagram of the command construction module 806 of the MSC system 205$a$, according to an example embodiment. The command construction (also referred to as "command computation") module 806 is executed to compute the commands 806$a$ for the electric motors and the steering angle to be applied to the vehicle 100 to achieve the drivability and the comfort. FIG. 14 describes steps for the construction of the commands of the motor forces and the steering angle from the solution vector $\chi^*$ of the optimization problem (25).

Initially, at step 1401, the solution vector (i.e., the optimal solution 805$a$) is parsed, and the commands for the changes in motor forces and steering angle along the future horizon 1401$a$ are separated from the optimal initial state and the modified desired state of the vehicle 1401$b$.

At step 1402, the optimal control 1402$a$ for the steering angle is obtained. To that end, the changes at the first step 1401 of the future prediction horizon of the motor forces are summed to the current values of the motor forces to obtain the command (i.e., command signal) for the motor forces. Further, the changes at the first step 1401 of the future prediction horizon of the steering angle is summed to the current values of the motor forces to obtain the optimal control for the steering angle $$u_{0|t}^* = u_{t-1} + \Delta u_{0|t}^* \quad (27)$$

At step, 1403, the optimal initial state and the modified desired state are used to compute the feedback term (19) 1403$a$.

At step 1404, the optimal component of command and the feedback component of command are summed to obtain the commands (also referred to as "full command") 806$a$:

$$u_t = u_{0|t}^* + \mathcal{F}(\xi_t - \xi_{0|t}^*) \quad (28)$$

The full command 806$a$ is sent to the actuator controller 207 of the vehicle 100 to change the state of the vehicle 100 and the chassis.

Summary of the Operation

Figure 15:
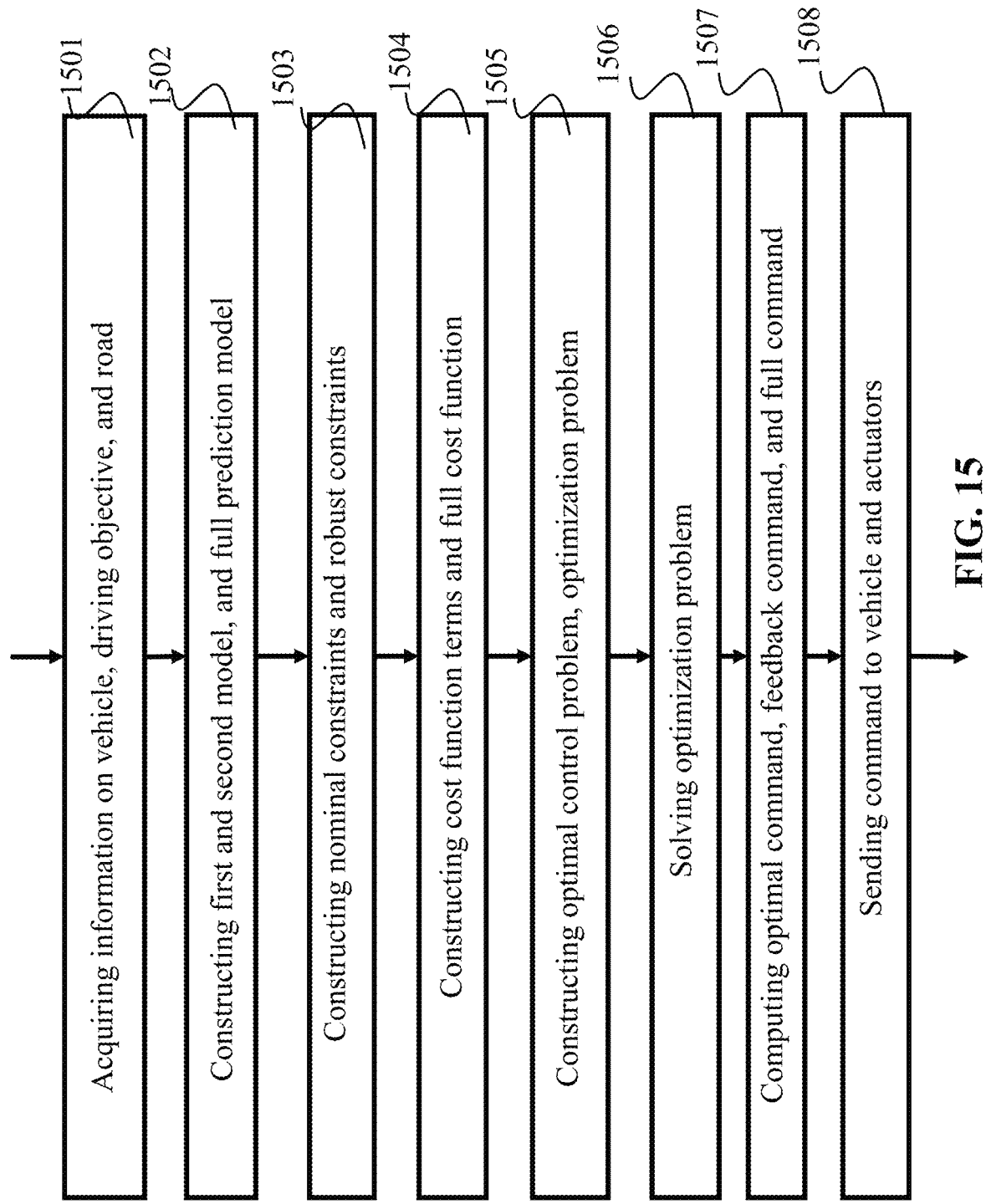
FIG. 15 shows steps of a method for controlling motion of the vehicle, according to an example embodiment.

FIG. 15 shows steps of a method 1500 for controlling the motion of the vehicle 100, according to an example embodiment. The step of the method 1500 in FIG. 15 are executed by the MSC system 205$a$, according to some embodiments of the present disclosure.

At step 1501, the information on state of the vehicle 100, on current driving condition and on the current driving objectives is obtained, and based on the obtained information the state of the first model 901 and second model, 902

$x^1$, $x^2$, respectively, the linear model parameter $\rho=[v_x a_x]$ and the references $a_x^r$, $\dot{\psi}^r$ are constructed.

At step 1502, using $\rho=[v_x a_x]$, first model 901 based on equation (12) and the second model 902 based on equation (15) are constructed and then the prediction model (also referred to as "full prediction model") expressed mathematically in equation (16) is constructed.

At step 1503, nominal constraints of equations (8)-(11) and the robust constraints of equation (17) are constructed.

At step 1504, the cost function terms (120-1205 of FIG. 12) are built and the full cost function 802 of equation (23) is constructed.

Further, at step 1505, based on the cost function 802, the optimal control problem (24) is built and then transformed into the numerical optimization problem of equation (25).

At step 1506, the numerical optimization problem is solved.

At step 1507, the optimal component (27) of the command signal and the feedback component of the command signal (199) are computed. Further, based on the optimal component (27) of the command signal and the feedback component of the command signal (199), the full command 806*a* of equation (28) is computed.

Finally, at step 1508, the full command 806*a* is sent to the actuator controller 207 of the vehicle 100 for execution, so that the state of the vehicle is changed.

Embodiments

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than shown, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling a motion of a vehicle including a chassis connected by suspensions to wheels touching a surface supporting the motion of the vehicle, wherein the vehicle is equipped with a steering system for steering at least some of the wheels and a plurality of electric motors for rotating the wheels, the controller comprising: a processor; and a memory having instructions stored thereon that, when executed by the processor, cause the controller to:

acquire motion information including a current state of the vehicle and a desired state of the vehicle, wherein a state of the vehicle defines at least one of a velocity of the vehicle, an acceleration of the vehicle, an orientation of the vehicle, and an orientation rate of the vehicle;

determine a combination of a steering angle of the wheels and motor forces delivered on the surface supporting the motion of the vehicle by the plurality of electric motors, for moving the vehicle from the current state into the desired state by minimizing a cost function of a difference between the current state of the vehicle and the desired state of the vehicle over a future prediction horizon using a dynamical model of the motion of the vehicle to produce control signals for actuators of the vehicle that actuate the motors of the vehicle and the steering system of the vehicle, wherein the dynamical model of the motion of the vehicle includes a first model of the motion of the vehicle and a second model of the motion of the chassis of the vehicle connected such that a change to a state of the first model causes a change of a state of the second model while the change to the state of the first model is independent of the change to the state of the second model, wherein the cost function penalizes an increase of one or a combination of a roll, a pitch, and a lift of the vehicle caused by a change of state of the vehicle; and control the actuators of the steering system of the vehicle and the motors of the vehicle according to the control signals.

2. The controller of claim 1, wherein the vehicle is driven by a user and the desired state is determined based on one or more user inputs to the steering system and an accelerator and a brake of the vehicle.

3. The controller of claim 1, wherein the vehicle is driven by an autonomous driving system and the desired state is determined based on information provided by a motion planner of the vehicle.

4. The controller of claim 1, wherein the command signal is modified by adding a feedback signal corresponding to a difference between the motion of the vehicle and the motion of the vehicle predicted by the first model, and wherein the feedback signal is used for correcting the difference between the motion of the vehicle and the motion of the vehicle predicted by the first model.

5. The controller of claim 1, wherein the first model of the motion of the vehicle is subject to first constraints dependent on the state of the second model of the motion of the chassis of the vehicle.

6. The controller of claim 1, wherein the cost function penalizes an increase of the difference between the current state and the desired state of the vehicle.

7. The controller of claim 1, wherein the cost function penalizes at least one of an amplitude of the command signal, and a rate of change of the command signal to the plurality of electric motors and the steering wheel when the amplitude of the command signal and the rate of change of the command signal deviate from zero.

8. The controller of claim 1, wherein the vehicle loses stability when the first constraints are violated at a current or and a future instance of time within the prediction horizon, and wherein the desired state of the vehicle is modified into a modified desired state of the vehicle when the desired state of the vehicle causes the vehicle to lose stability by selecting a modified desired state that together with the current state of the vehicle belongs to an invariant set of the first model of the motion of the vehicle and a feedback gain receiving the modified desired state, wherein the invariant set is contained in a region where the state of the vehicle satisfies the first constraints.

9. The controller of claim 8, wherein the cost function penalizes the difference between the desired state of the vehicle and the modified desired state of the vehicle.

10. The controller of claim 1, wherein the first model and the second model are linear parameter varying models dependent on parameters of the current state of the vehicle.

11. The controller of claim 5, wherein the first model of the motion of the vehicle has an uncertainty, and wherein the first constraints on the first model include robust constraints defined such that when the robust constraints are satisfied by the state of the vehicle according to the first model of the motion of the vehicle, an evolution of the state of the vehicle according to the first model of the motion of the vehicle having the uncertainty satisfies the first constraints.

12. The controller of claim 11, wherein the robust constraints are based on a tightening set, wherein the tightening set is computed as an invariant set for the first model for an uncertainty set that contains the uncertainty on the first model of the motion of the vehicle.

13. The controller of claim 12, wherein the uncertainty set of the first model of the motion of the vehicle is constructed based on a difference between the state motion of the vehicle as predicted by the first model of the motion of the vehicle and the measured state of the motion of the vehicle.

14. A method for controlling motion of a vehicle including a chassis connected by suspensions to wheels touching a surface supporting the motion of the vehicle, wherein the vehicle is equipped with a steering system for steering at least some of the wheels and a plurality of electric motors for rotating the wheels, wherein the method uses a processor coupled with stored instructions implementing the method, wherein the instructions, when executed by the processor carry out at steps of the method, comprising:

acquiring motion information including a current state of the vehicle and a desired state of the vehicle, wherein a state of the vehicle defines at least one of a velocity of the vehicle, an acceleration of the vehicle, an orientation of the vehicle, and an orientation rate of the vehicle;

determining a combination of a steering angle of the wheels and motor forces delivered on the surface supporting the motion of the vehicle by the plurality of electric motors, for moving the vehicle from the current state into the desired state by minimizing a cost function of a difference between the current state of the vehicle and the desired state of the vehicle over a future prediction horizon using a dynamical model of the motion of the vehicle to produce control signals for actuators of the vehicle that actuate the motors of the vehicle and the steering system of the vehicle, wherein the dynamical model of the motion of the vehicle includes a first model of the motion of the vehicle and a second model of the motion of the chassis of the vehicle connected such that a change to a state of the first model causes a change of a state of the second model while the change to the state of the first model is independent of the change to the state of the second model, wherein the cost function penalizes an increase of one or a combination of a roll, a pitch, and a lift of the vehicle caused by a change of state of the vehicle; and controlling the actuators of the steering system of the vehicle and the motors of the vehicle according to the control signals.

15. The method of claim 14, wherein the vehicle is driven by a user and the desired state is determined based on one or more user inputs to the steering systems and an accelerator and a brake of the vehicle.

16. The method of claim 14, wherein the vehicle is driven by an autonomous driving system and the desired state is determined based on information provided by a motion planner of the vehicle.

17. The method of claim 14, wherein the command signal is modified by adding a feedback signal corresponding to a difference between the motion of the vehicle and the motion of the vehicle predicted by the first model, and wherein the feedback signal is used for correcting the difference between the motion of the vehicle and the motion of the vehicle predicted by the first model.

18. The method of claim 14, wherein the first model of the motion of the vehicle is subject to first constraints dependent on the state of the second model of the motion of the chassis of the vehicle, wherein the cost function penalizes an increase of the difference between the current state and the desired state of the vehicle wherein the cost function penalizes at least one of an amplitude of the command signal, and a rate of change of the command signal to the plurality of electric motors and the steering wheel when the amplitude of the command signal and the rate of change of the command signal deviate from zero.

19. The method of claim 14, wherein the vehicle loses stability when the first constraints are violated at a current or and a future instance of time within the prediction horizon, and wherein the desired state of the vehicle is modified into a modified desired state of the vehicle when the desired state of the vehicle causes the vehicle to lose stability by selecting a modified desired state that together with the current state of the vehicle belongs to an invariant set of the first model of the motion of the vehicle and a feedback gain receiving the modified desired state, wherein the invariant set is contained in a region where the state of the vehicle satisfies the first constraints.

20. A non-transitory computer-readable storage medium embodied thereon a program executable by a processor for performing a method for controlling motion of a vehicle including a chassis connected by suspensions to wheels touching a surface supporting the motion of the vehicle, wherein the vehicle is equipped with a steering system for steering at least some of the wheels and a plurality of electric motors for rotating the wheels, the method comprising:

acquiring motion information including a current state of the vehicle and a desired state of the vehicle, wherein a state of the vehicle defines at least one of a velocity of the vehicle, an acceleration of the vehicle, an orientation of the vehicle, and an orientation rate of the vehicle;

determining a combination of a steering angle of the wheels and motor forces delivered on the surface supporting the motion of the vehicle by the plurality of electric motors, for moving the vehicle from the current state into the desired state by minimizing a cost function of a difference between the current state of the vehicle and the desired state of the vehicle over a future prediction horizon using a dynamical model of the motion of the vehicle to produce control signals for actuators of the vehicle that actuate the motors of the vehicle and the steering system of the vehicle, wherein the dynamical model of the motion of the vehicle includes a first model of the motion of the vehicle and a second model of the motion of the chassis of the vehicle connected such that a change to a state of the first model causes a change of a state of the second model while the change to the state of the first model is independent of the change to the state of the second model, wherein the cost function penalizes an increase of one or a combination of a roll, a pitch, and a lift of the vehicle caused by a change of state of the vehicle; and controlling the actuators of the steering system of the vehicle and the motors of the vehicle according to the control signals.

* * * * *